United States Patent
Nixon et al.

(10) Patent No.: US 11,558,679 B1
(45) Date of Patent: Jan. 17, 2023

(54) SYSTEMS AND METHODS FOR SUBMITTING VIDEO EVIDENCE

(71) Applicant: AMAZON TECHNOLOGIES, INC., Seattle, WA (US)

(72) Inventors: Quinton Choice Nixon, Sherman Oaks, CA (US); Michael Robert Harris, Phoenixville, PA (US); Alyssa Ainna Manlapig, Avondale, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 412 days.

(21) Appl. No.: 16/272,879

(22) Filed: Feb. 11, 2019

Related U.S. Application Data

(60) Provisional application No. 62/637,023, filed on Mar. 1, 2018.

(51) Int. Cl.
| | |
|---|---|
| *H04N 21/8549* | (2011.01) |
| *H04N 21/4223* | (2011.01) |
| *H04N 7/18* | (2006.01) |
| *H04N 21/4402* | (2011.01) |

(52) U.S. Cl.
CPC ......... *H04N 21/8549* (2013.01); *H04N 7/183* (2013.01); *H04N 21/4223* (2013.01); *H04N 21/4402* (2013.01)

(58) Field of Classification Search
CPC ........... H04N 21/8549; H04N 21/8352; H04N 21/4223; H04N 21/4402; H04N 7/183; G11B 27/031
USPC ........................................................ 386/239
See application file for complete search history.

(56) References Cited

U.S. PATENT DOCUMENTS

| | | |
|---|---|---|
| 7,193,644 B2 | 3/2007 | Carter |
| 8,139,098 B2 | 3/2012 | Carter |
| 8,144,183 B2 | 3/2012 | Carter |
| 8,154,581 B2 | 4/2012 | Carter |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |

(Continued)

*Primary Examiner* — Helen Shibru
(74) *Attorney, Agent, or Firm* — Lee & Hayes, P.C.

(57) ABSTRACT

Systems, methods, and software for submitting video evidence. A request is received from a user of a security device to submit an identified video clip as video evidence to an agency, and the identified video clip and corresponding metadata is retrieved from a database of video clips. Additional information about content of the video clip is interactively collected from the owner and a digital signature is received from the owner. A video evidence file is generated to include the content of the identified video clip, information regarding capture of the video clip based upon the metadata, the additional information, and the digital signature. The video evidence file is then communicated to the agency.

15 Claims, 15 Drawing Sheets

(56) References Cited

U.S. PATENT DOCUMENTS

| | | |
|---|---|---|
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 9,820,120 B2 * | 11/2017 | deCharms ............ G06Q 50/265 |
| 10,373,015 B2 * | 8/2019 | Baek ...................... G06T 7/194 |
| 10,719,543 B2 * | 7/2020 | Ihara ..................... H04N 7/181 |
| 11,232,685 B1 * | 1/2022 | Nixon ................... H04N 7/186 |
| 2010/0037267 A1 * | 2/2010 | Bennett ................ H04N 7/165 |
| | | 725/56 |
| 2010/0274816 A1 * | 10/2010 | Guzik ................. G11B 27/034 |
| | | 707/802 |
| 2011/0243458 A1 * | 10/2011 | Yoshioka ............. G06T 1/0021 |
| | | 382/209 |
| 2015/0084745 A1 * | 3/2015 | Hertz ...................... H04W 4/12 |
| | | 340/10.3 |
| 2017/0230676 A1 * | 8/2017 | Filipovic ................ H04N 19/40 |
| 2021/0027591 A1 * | 1/2021 | Davies ................. H04L 67/535 |

\* cited by examiner

SYSTEMS AND METHODS FOR SUBMITTING VIDEO EVIDENCE

RELATED APPLICATION

This application claims priority to U.S. Provisional Patent Application Ser. No. 62/637,023, filed on Mar. 1, 2018, the entire contents of which are incorporated herein by reference.

TECHNICAL FIELD

The present embodiments relate to security devices including audio/video (A/V) recording and communication doorbells, security cameras, and the like. In particular, the present embodiments relate to improvements in the functionality of security devices that strengthen the ability of such devices to reduce crime and enhance public safety.

BACKGROUND

Security devices, such as camera devices, typically capture video (and sometimes also audio) of events occurring within their field of view. This video may contain evidence of a crime that would be useful to law enforcement.

DETAILED DESCRIPTION OF THE EMBODIMENTS

Figure 1:
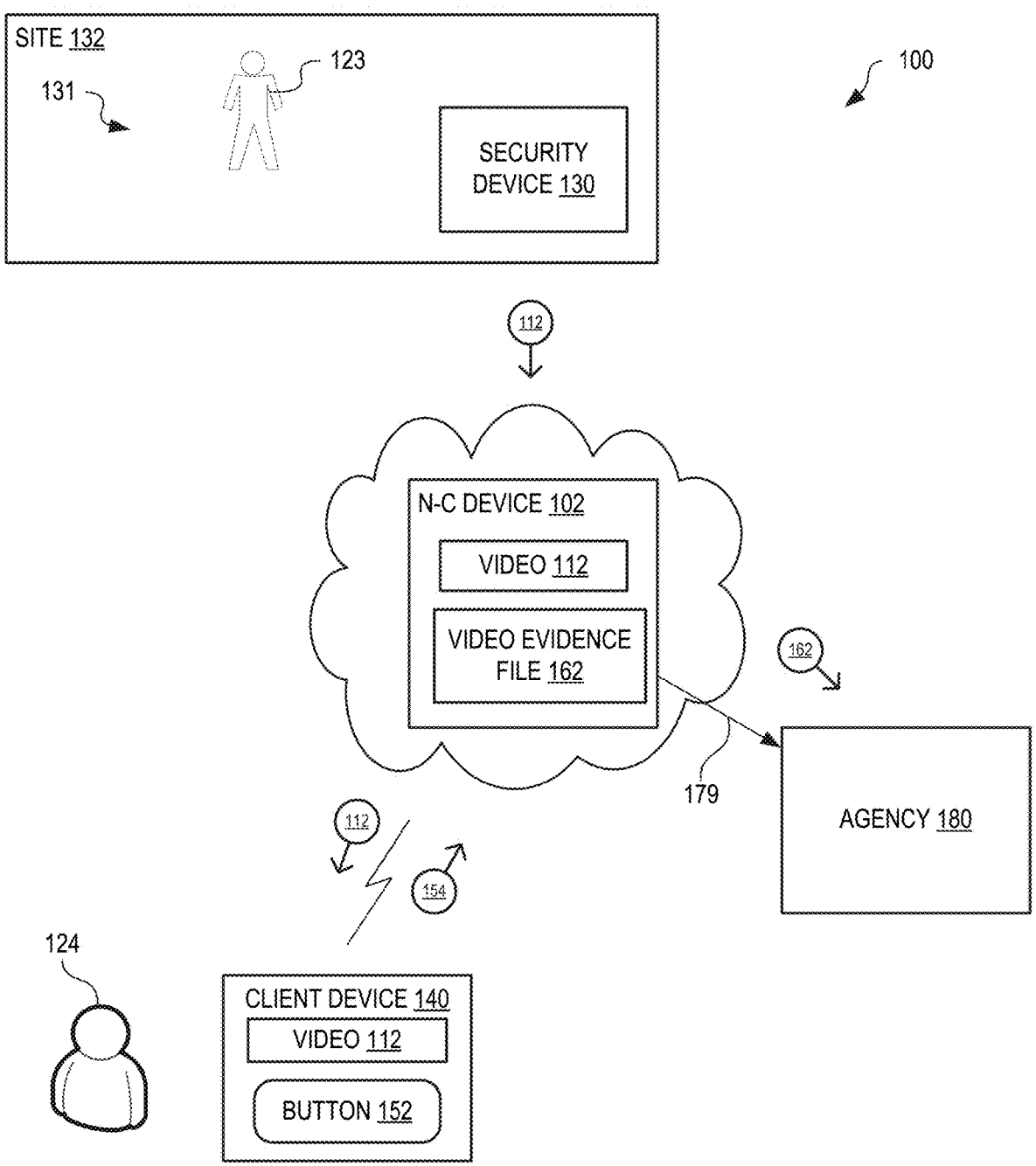
FIG. 1 is a functional block diagram illustrating one example system for submitting video evidence, in an embodiment.

The following detailed description describes the present embodiments with reference to the drawings. In the drawings, reference numbers label elements of the present embodiments. These reference numbers are reproduced below in connection with the discussion of the corresponding drawing features.

One aspect of the present embodiments includes the realization that while security devices, such as those installed at residential and office properties, have cameras that capture video clips that may contain evidence of crimes or other events, it can be difficult for users of these security devices to provide these video clips to law enforcement agencies and/or insurance agencies when needed. This difficulty can be compounded by the fact that the user may be in a traumatized state as a result of the event (e.g., a home break-in, vandalism, car theft, and so on). The present embodiments solve this problem by providing a convenient way for an owner (or user) of the security device to quickly and easily prepare a video evidence file for these agencies with any video clip that contains relevant evidence.

Another aspect of the present embodiments includes the realization that a law enforcement agency or an insurance agency may require video evidence to be submitted in a standardized way so that the agency may receive and process the video evidence. The present embodiments solve this problem by providing a file format for a video evidence file that includes at least some of: a video clip captured by a security device, additional information about the video clip such as a capture location, a timestamp of when the video clip was captured, a unique identity of the security device that captured the video clip, a summary describing the content of the video clip, and a digital signature of the owner indicative of the veracity of the information contained within the video evidence file. Advantageously, by facilitating submission of video evidence in a consistent format, agencies will be able to efficiently use the video evidence, thereby making it easier for law enforcement to solve crimes and apprehend perpetrators, and resulting in faster resolution of insurance claims.

Another aspect of the present embodiments includes the realization that a live report file corresponding to a live event may be marked as an emergency such that a law enforcement agency may respond immediately. Advantageously, the live report file may be quickly and silently generated by a user watching a live video stream of the live event to include a location of the live event and image and/or video evidence that allows responders to be more informed.

When a user becomes aware that a security device has captured video evidence of an event that may be of interest to other parties (e.g., neighbors, or an agency such as a law enforcement or insurance agency), it is beneficial to collect additional information on the event. When the user is already traumatized as a result of the event (e.g., a home break-in, vandalism, car theft, and so on), it is beneficial to make the process of collecting and preparing a report on the event as simple and as automatic as possible. The present embodiments provide these advantages, as described below.

FIG. 1 is a functional block diagram illustrating one example system 100 for submitting a video evidence file 162 (e.g., to an agency 180 such as a law enforcement or insurance agency). A security device 130 is configured at a site 132 to capture live video of an event within an environment 131 monitored by the security device 130. The security device 130 may be an audio/video communication device (see, e.g., FIG. 10, and embodiments within FIGS. 14 and 15) and includes a camera (and, in some embodiments, may also include a motion detector). The site 132 may be, for example, one of a residence, an office, a retail store, and so on. When a person 123 (e.g., a visitor, an intruder, and so on) is detected within the environment 131, the security device 130 captures and sends live video (e.g., a live video stream from the camera of the security device 130) to a network-connected device 102 (e.g., a server, a home automation hub, a premises security hub, and so on) where it may be stored as a video clip 112. The network-connected device 102 may be implemented as a cloud-based computer that is in communication with the security device 130 and may store the video clip 112 and/or stream the video clip 112 to a client device 140 for viewing by a user 124 of the client device 140. The client device 140 may be, for example, a smartphone, a tablet computer, a desktop computer, or another computing device. The user 124 is, for example, an owner of the security device 130 and residence at the environment 131 and/or is empowered to manage operation of the security device 130. When the person 123 is detected within the environment 131, the user 124 may view the video clip 112 on the client device 140 in real-time and optionally converse with the person 123. Alternatively, the user 124 may view the video clip 112 at a later time by retrieving it from the network-connected device 102 and viewing it on the client device 140.

When, upon viewing the video clip 112, the user 124 determines that the video clip 112 contains evidence of an event that should be submitted to the agency 180, the user 124 may interact with the client device 140 to indicate that the video clip 112 should be submitted to the agency 180. For example, the user 124 may select a button 152, via the client device 140 and during viewing of the video clip 112, to indicate that it is to be used as video evidence. In another example, the user 124 may select the video clip 112 from a list of video clips stored on the network-connected device 102 (or within the data store, see FIG. 2) to indicate that it should be used as video evidence. To facilitate submission to the agency 180, the video clip 112 is prepared as the video evidence file 162 that has a format that is usable by the agency 180, or any other intended receiving entity, as described below.

In one embodiment, the user 124 selects the button 152 to send a request 154 instructing the network-connected device 102 to package the video clip 112 within the video evidence file 162 for transmission to the agency 180. The network-connected device 102 may collect additional information from the user 124 that is included within the video evidence file 162, as described in detail below. In certain embodiments, the network-connected device 102 may send the video evidence file 162 to the agency 180 using a secured connection 179. For example, the network-connected device 102 may send the video evidence file 162 to a submission web address (e.g., a website) provided by a law enforcement agency (as the agency 180). In other embodiments, the video evidence file 162, once prepared from the video clip 112, may be sent to the client device 140 for the user 124 to send to the agency 180 using email, the web address of the agency 180, or any other communication method. In certain embodiments, at least part of the video evidence file 162 may be output to a hardcopy device (e.g., a printer) for delivery to the agency 180. For example, a summary of the video evidence file 162 may be printed as a report and delivered to the agency 180 and/or kept as a record by the user 124. In one embodiment, an application running on the client device 140 (see FIG. 2) prepares the video evidence file 162 from the video clip 112 and information collected during interaction with the user 124 (e.g., interaction between the network-connected device 102 and the client device 140), and sends the video evidence file 162 to the agency 180. This transmission may occur via the web address of the agency, by email, or by another communication method, even via the network-connected device 102. The video evidence file 162 may be compressed and/or encrypted such that it is conveniently and securely handled.

Figure 2:
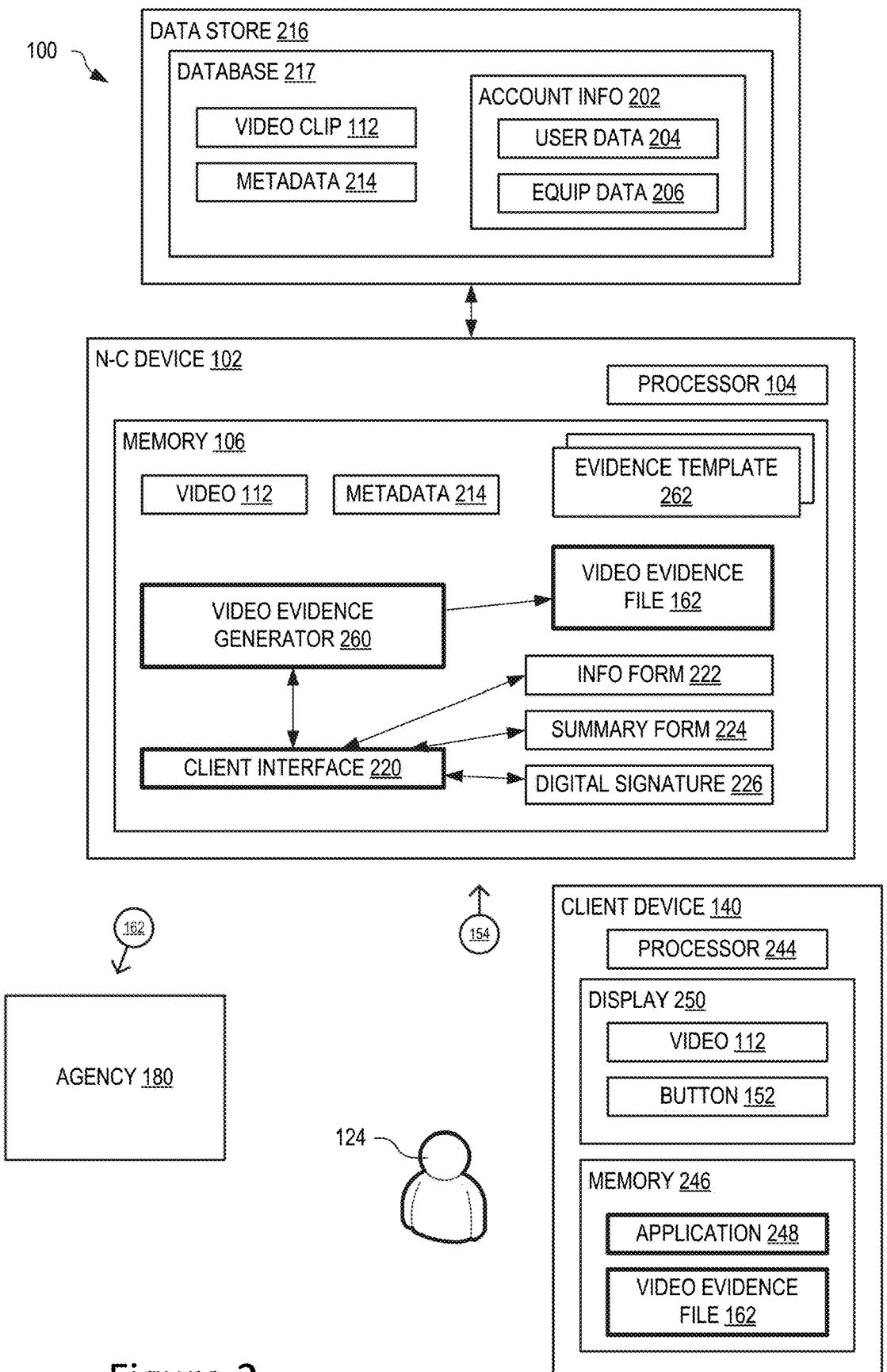
FIG. 2 is a functional block diagram illustrating the system of FIG. 1 in further detail, including generation of the video evidence corresponding to the video clip, in an embodiment.

FIG. 2 is a functional block diagram illustrating the system 100 of FIG. 1 in further detail, and showing generation of the video evidence file 162 corresponding to the video clip 112. In the embodiment of FIG. 2, the system 100 may include a data store 216 that stores the video clip 112 and its associated metadata 214 within a database 217. In other embodiments, functionality of the data store 216 may be included within the network-connected device 102, and the video clip 112 and associated metadata 214 are stored within memory 106, such as within a database implemented within the memory 106. The client device 140 may be, for example, a computer, and may include a processor 244, a memory 246, and a display 250. The client device 140 may run an application 248 that has machine-readable instructions stored within the memory 246 that, when executed by the processor 244, control the processor 244 to implement the functionality of the client device 140 as described herein.

The metadata 214 may be collected automatically by the system 100, and may include information relating to the video clip 112, such as one or more of a recording time, a duration, a video format, a framerate, a video resolution, an audio format, a capture location, a unique identifier of the security device 130, a unique video clip identifier, and so on. The metadata 214 thus contains information that is collected automatically by the system 100 when the video clip 112 is captured by the security device 130. The video clip 112 and associated metadata 214 may be stored in association with account information 202 of the user 124. The account information 202 may include user data 204 that includes information of the user 124 and equipment data 206 that includes information of the security device 130 (and even other security devices 130 linked with the user 124) and of the client device 140 associated with the user 124. For example, the user data 204 may include name and contact information (e.g., a postal address, an email address, telephone numbers, and so on) of the user 124. The equipment data 206 may include a geographic location (e.g., latitude and longitude, GNSS (Global Navigation Satellite System) coordinates, etc.) of the security device 130 associated with the user 124, the type of the security device 130 (e.g., video doorbell, floodlight security camera, and so on), performance characteristics (e.g., video resolution and frame rate, etc.) of the security device 130, an identifier (e.g., a MAC (Media Access Control) address) for the client device 140, communication preferences (e.g., URL (Uniform Resource Locator), email address, text address, telephone number, and so on) for the client device 140, and so on. The account information 202 may be, for example, configured during registration of the user 124, the client device 140, and the security device 130 with the network-connected device 102, and/or may be collected during purchase of the security device 130.

Figure 3:
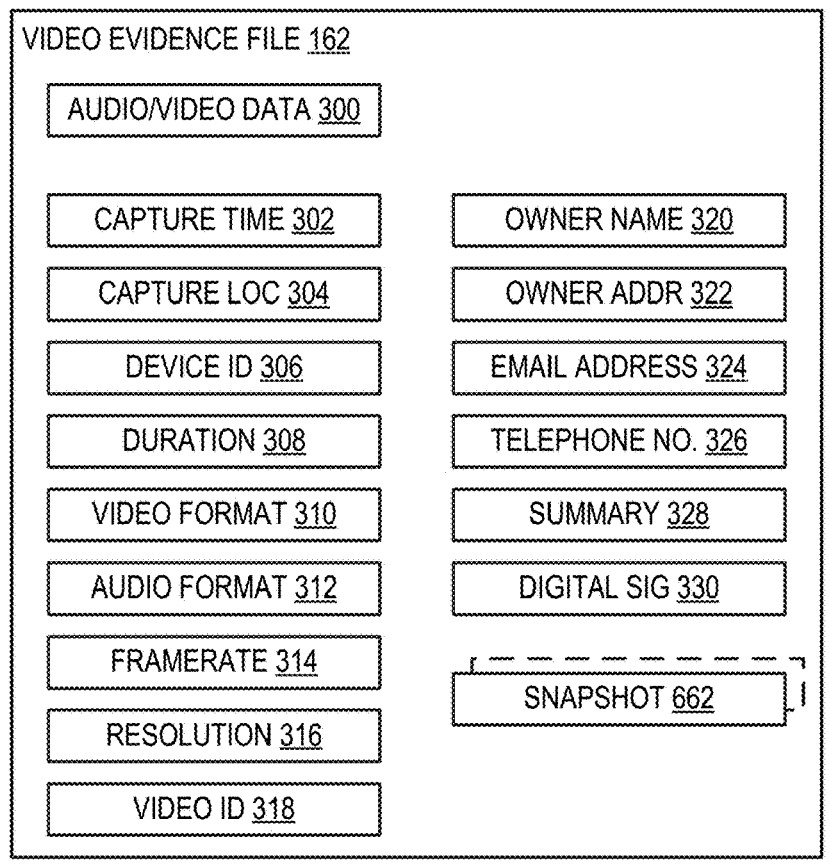
FIG. 3 is a functional block diagram illustrating the video evidence file of FIGS. 1 and 2 in further example detail, in an embodiment.

FIG. 3 shows the video evidence file 162 of FIGS. 1 and 2 in further example detail. The video evidence file 162 may include audio/video data 300 that is generated from the video clip 112, a capture time 302 that is a timestamp of when the video clip 112 was captured, a capture location 304 that defines a geographic location of the security device 130 when it captured the video clip 112, a device ID 306 that uniquely identifies the security device 130, a duration 308 that may define the length, in time, of the video clip 112, a video format 310 that defines a format used to digitally store the video clip 112, an audio format 312 that defines a format used to store audio associated with the video clip 112, a framerate 314 that defines a number of frames of the video clip 112 that are to be displayed per second during playback, a resolution 316 that defines a size (e.g., in pixels) of images that form the video clip 112, a video ID 318 that uniquely identifies the video clip 112 within the data store 216, an owner name 320 that is the name of the user 124, an owner address 322 that may be a postal address of the user 124 and/or an address where the security device 130 is installed, an email address 324 of the user 124, a telephone number 326 of the user 124, a summary 328 that stores the descriptive summary of the video clip 112 provided by the user 124, and a digital signature 330 that may be provided by the user 124 to indicate veracity and/or authenticity of any provided information.

In the embodiment of FIG. 2, the network-connected device 102 includes a video evidence generator 260 with machine-readable instructions stored within the memory 106 that, when executed by a processor 104, generate the video evidence file 162 based upon the video clip 112. For example, the video evidence generator 260 processes the video clip 112 and generates the audio/video data 300 into a required format used by the agency 180. In an embodiment, an evidence template 262 defines a specific format for the video evidence file 162, and the video evidence generator 260 converts the video clip 112 from the format used by the security device 130 and/or the network-connected device 102 to a usable format for the agency 180. The video evidence generator 260 processes and/or generates metadata 214 corresponding to the video clip 112 to determine one or more of the capture time 302, the capture location 304, the device ID 306, and the duration 308 (FIG. 3). In certain embodiments, where certain parameters are not defined within the metadata 214, the video evidence generator 260 may calculate the parameter(s). For example, the video evidence generator 260 may determine the duration 308 from the framerate 314 and a count of frames within the video clip 112. Similarly, where the framerate 314 is not defined, the video evidence generator 260 may determine the framerate 314 from the duration 308 and the count of frames within the video clip 112. In another example, the video evidence generator 260 may determine the resolution 316 by analyzing the frames of the video clip 112. In another example, the video evidence generator 260 may determine the audio format 312 by analyzing the audio within the video clip 112.

The video evidence generator 260 may identify the account information 202 of the user 124, based upon the security device 130 that captured the video clip 112 and/or login information of the user 124, to retrieve one or more of the owner name 320, the owner address 322, the email address 324, and the telephone number 326 of the user 124 from the associated user data 204. Where certain information of the user 124 is not contained within the user data 204 of account information 202, the video evidence generator 260 of one embodiment invokes a client interface 220 to present an information form 222 to the user 124; the form is prepopulated with information that is available within the account information 202 via the application 248 for validation and/or completion by the user 124.

Where the video evidence file 162 is to include the summary 328, as defined by the evidence template 262, for example, the video evidence generator 260 may invoke the client interface 220 to interact with the user 124, via a web interface or via the application 248, to present a summary form 224 requesting additional information from the user 124, and include information from the summary form 224 as the summary 328 of the video evidence file 162. For example, the summary form 224 may include prompts and questions to request information such as observations by the user 124 of the affected environment, a summary of actions within the video clip 112, contact information of other witnesses to the event, and so on. The network-connected device 102 may store other forms, similar to forms 222 and 224, based upon information required by the evidence template 262. In certain embodiments, the forms 222 and 224 may be preloaded into the application 248 such that the application may use the forms to collect information when interacting with the user 124.

Once the user 124 has completed and reviewed the information (e.g., forms 222 and 224) to be included within the video evidence file 162, the client interface 220 may interact with the user 124 to receive a digital signature 226 for inclusion with the video evidence file 162 to indicate veracity of the information provided within the video evidence file 162. Where the video evidence file 162 is to be provided to entities (e.g., neighbors) that do not require authentication of the presented information, the digital signature 226, and certain other information (e.g., email address, telephone number, etc.) may be omitted from the video evidence file 162, as defined within the evidence template 262. The video evidence generator 260 may be invoked more than once to generate more than one video evidence file 162 where different content is required by different recipients of the video evidence file 162. The video evidence generator 260 may also be invoked for multiple security devices 130 linked with the user 124, such as multiple security cameras surrounding a household.

In certain embodiments, the video evidence generator 260 may determine one or more of the video format 310, the audio format 312, the framerate 314, and the resolution 316 for the video evidence file 162 based upon the evidence template 262 that defines the format required or requested by the agency 180. The evidence template 262 may thus define the required content and format thereof for the video evidence file 162. Accordingly, the video evidence generator 260 generates the video evidence file 162 to include the defined information in the defined format according to the evidence template 262 converting the format of certain data items as necessary. In certain embodiments, the user 124 may select the agency 180 from a list of agencies, where the network-connected device 102 stores at least one evidence template 262 corresponding to each of the listed agencies. Once sufficient information has been collected from the user 124, the video evidence generator 260 may send the video evidence file 162 to the agency 180 and/or to the client device 140 such that the user 124 is able to send the video evidence file 162 to the agency 180 and/or output at least part of the video evidence file 162 to a hardcopy device (e.g., a printer). For example, a summary of the video evidence file 162 may be printed as a report and delivered to the agency 180 and/or kept as a record by the user 124.

Figure 4:
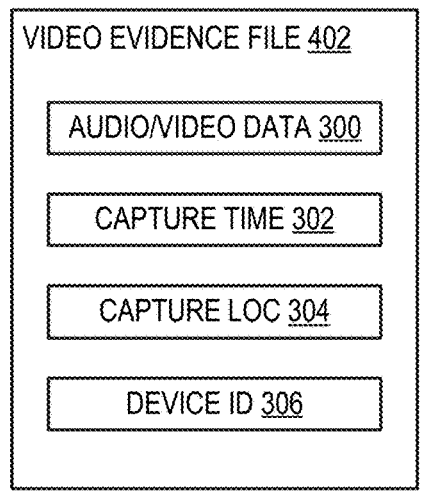
FIG. 4 is a functional block diagram illustrating an example video evidence file that contains audio/video data, capture time, capture location, and device ID, in an embodiment.

FIG. 4 shows one example video evidence file 402 that contains the audio/video data 300, the capture time 302, the capture location 304, and the device ID 306. In the embodiment of FIG. 4, the evidence template 262 requires minimal information within the video evidence file 402, for example where the agency 180 automatically determines other information relating to the audio/video data 300 by analyzing the format of the audio/video data 300. The agency 180 may derive additional information relating to the user 124 using the device ID 306. For example, since the device ID 306 identifies the security device 130 that captured the video clip 112, information of the user 124 may be derived through the association of the device ID 306 with the user 124. For example, based upon the device ID 306, law enforcement as the agency 380 may have authority to request additional information directly from the network-connected device 102. In response to such a request, the network-connected device 102 may interrogate the account information 202 corresponding to the equipment data 206 containing the device ID 306 to retrieve information of the user 124 from the user data 204, and thereby provide information of the owner of the security device 130 to the agency 180. Other information may be included with the video evidence file 402, based upon the evidence template 262 for example, without departing from the scope of the embodiments described herein. For example, one or more evidence templates 262 may be defined to control the video evidence generator 260 to create the video evidence file 162 with appropriate content and format.

Figure 5:
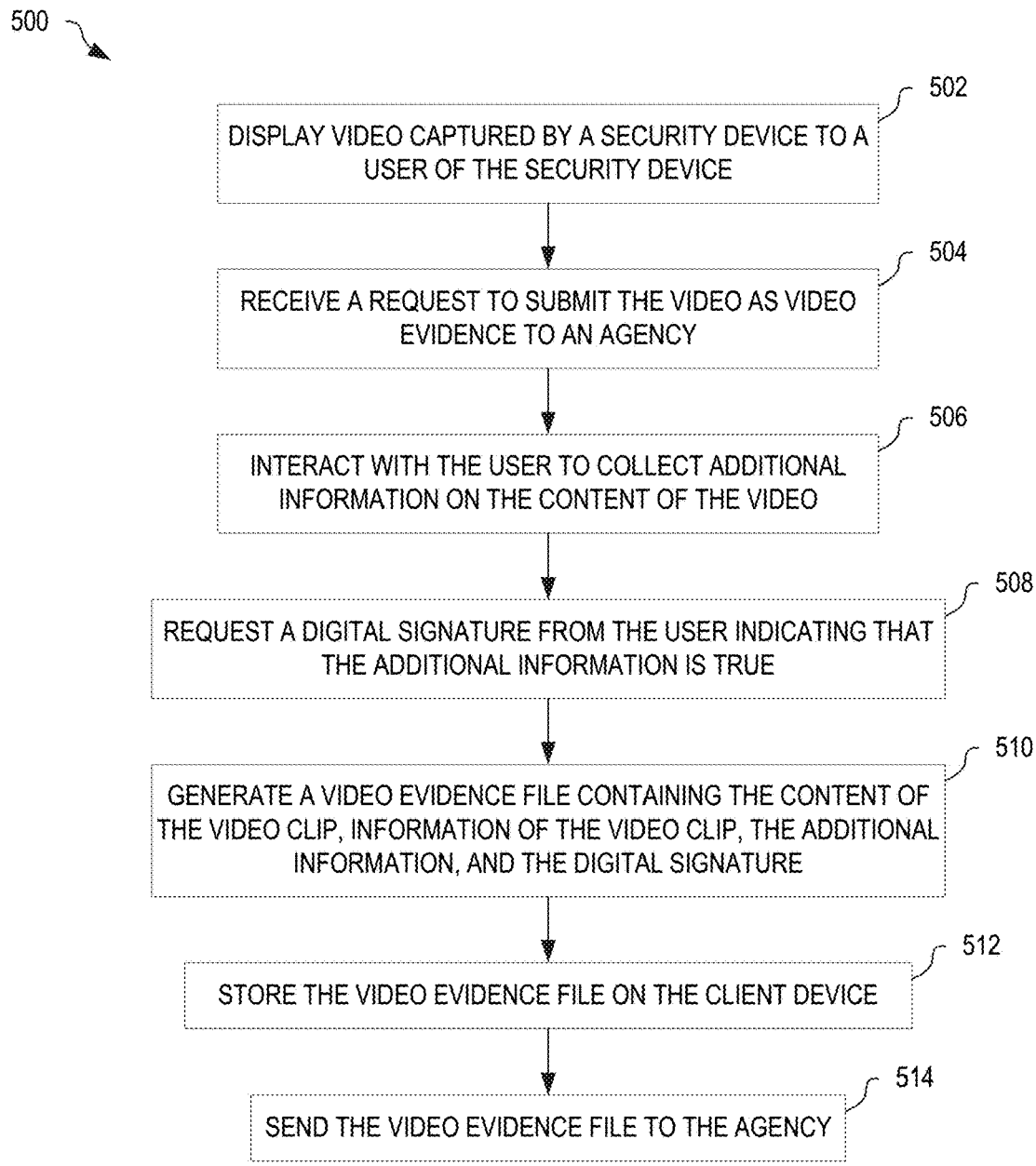
FIG. 5 is a flowchart illustrating one example method for submitting video evidence, in an embodiment.

FIG. 5 is a flowchart illustrating one example method 500 for submitting video evidence. The method 500 may be, for example, implemented, at least in part, within the video evidence generator 260 of FIG. 2, at least in part within the client interface 220, and at least in part within the application 248 executing on the client device 140. In certain embodiments, the method 500 may be implemented entirely within the application 248 executing on the client device 140.

In block 502, the method 500 displays video captured by a security device to a user of the security device. In one example of block 502, the network-connected device 102 sends the video clip 112, captured by the security device 130, to the client device 140 for display to the user 124 on the display 250.

In block 504, the method 500 receives a request to submit the video as video evidence to an agency, such as a law enforcement agency. In one example of block 504, the video evidence generator 260 receives a request 154 from the client device 140 when the user 124 selects the button 152 while watching the video clip 112. In another example of block 504, the video evidence generator 260 receives the request 154 when the user 124 logs into and interacts with a web address provided by the network-connected device 102 and selects the video clip 112 from a list of videos captured by the security device 130 of the user 124.

In block 506, the method 500 interacts with the user to collect additional information of the content of the video. In one example of block 506, the video evidence generator 260 invokes the client interface 220 to collect additional information from the user 124 using the summary form 224. In another example of block 506, the video evidence generator 260 invokes the client interface 220 to cooperate with the application 248 running on the client device 140 to interact with the user 124 to complete the summary form 224.

In block 508, the method 500 requests a digital signature from the user indicating that the additional information provided by the user 124 is true. In one example of block 508, the client interface 220 prompts the user 124 to provide the digital signature 226 for inclusion in the video evidence file 162.

In block 510, the method 500 generates the video evidence file containing the video, information of the video, the additional information, and the digital signature. In one example of block 510, the video evidence generator 260 generates the video evidence file 162 to contain the video clip 112, the information form 222, the summary form 224, and the digital signature 226. In another example of block 510, the video evidence generator 260 generates the video evidence file 402 to contain the audio/video data 300, the capture time 302, the capture location 304, and the device ID 306.

In block 512, the method 500 stores the video evidence on the client device. In one example of block 512, the video evidence generator 260 sends the video evidence file 162 to the client device 140 where it is stored within the memory 246.

In block 514, the method 500 sends the video evidence to the agency, such as a law enforcement agency. In one example of block 514, the video evidence generator 260 sends the video evidence file 162 to the agency 180.

Figure 6:
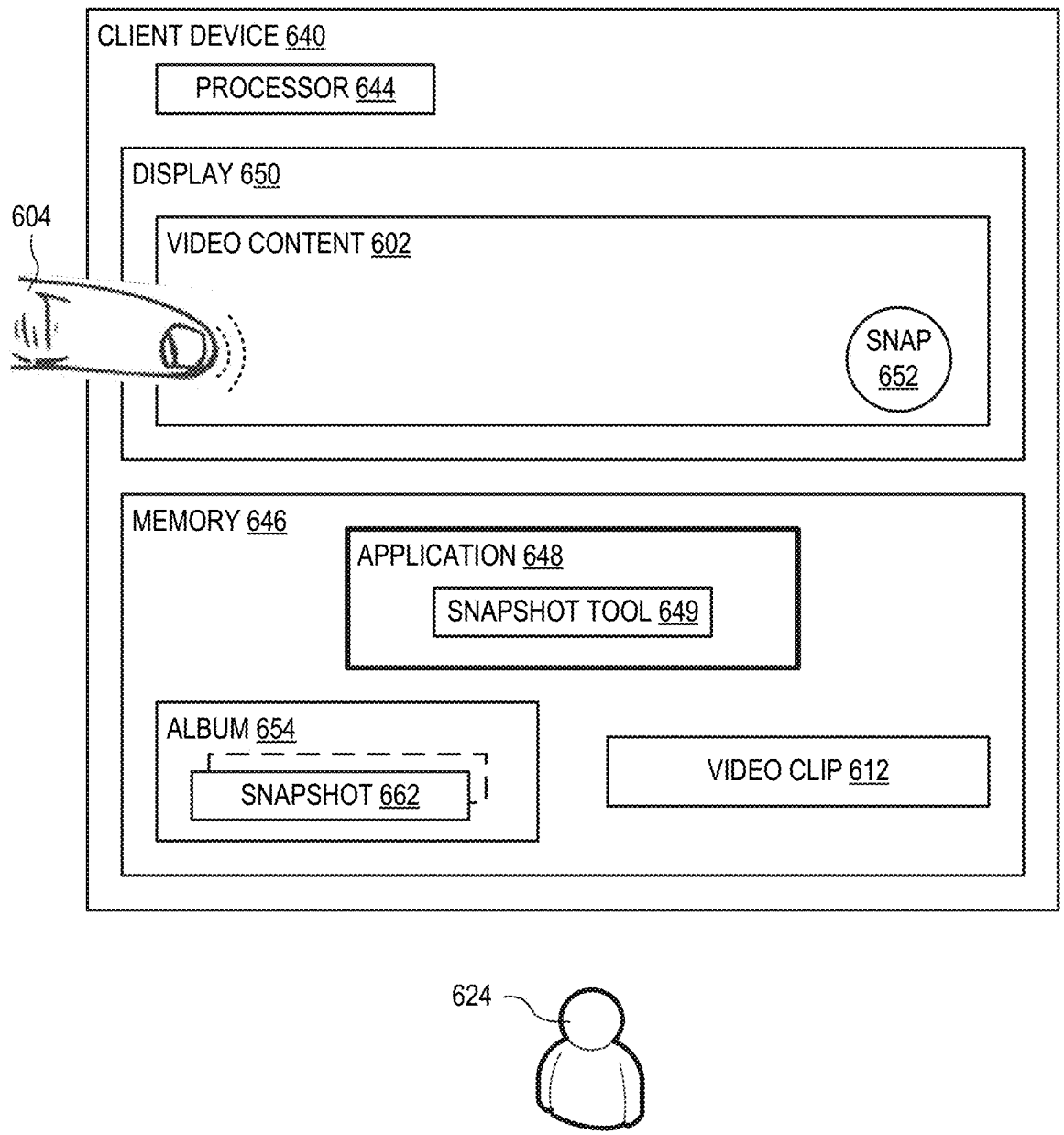
FIG. 6 is a functional block diagram illustrating capture of a snapshot from a video clip by a user of a client device, in an embodiment.

FIG. 6 illustrates capture of a snapshot 662 from a video clip 612 by a user of a client device 640. The client device 640 may implement functionality of the client device 140 of FIGS. 1 and 2, and have a processor 644, a memory 646 communicatively coupled with the processor 644, and an application 648 that has machine-readable instructions stored within the memory 646 that, when executed by the processor 644, enable a user 624 to capture snapshots of the video clip 612 being displayed on a display 650 of the client device 640. The client device 640 may communicate with the network-connected device 102 of FIGS. 1 and 2 to receive the video clip 612, which is similar to the video clip 112 captured by the security device 130.

During display of the video clip 612 on the display 650 of the client device 640, the user 624 may activate a snapshot tool 649 of the application 648 by double tapping with his or her finger 604 (or using any other input technique and/or device) on video content 602 displayed on the display 650. In certain embodiments, the application 648 displays a snap button 652 on the display 650 during playback of the video clip 612, and invokes the snapshot tool 649 when the user 624 selects the snap button 652.

When invoked, the snapshot tool 649 captures a currently displayed image of the video clip 612 as a snapshot 662 that may be stored within an album 654 within the memory 646. In one embodiment, the album 654 may represent a photo album of the client device 640, such as a photo album of a smartphone that stores images captured by a camera of the smartphone or other associated device. In another embodiment, the album 654 may represent an album associated with the application 648 that stores video and/or snapshots 662 relating to the security device 130. The user 624 may capture multiple snapshots 662 from more than one video clip 612.

In certain embodiments, the application 648 may upload the one or more snapshots 662 (and/or references to corresponding frames of the one or more video clips 612 corresponding to the snapshots 662) to the network-connected device 102 of FIGS. 1 and 2 where it may be included within the video evidence file 162, as shown in FIG. 3.

Advantageously, the user 624 may conveniently capture one or more snapshots 662 while viewing the video clip 612 such that they may be retrieved for later viewing or transmission as evidence without having to view or search through the video clip 612 again. In certain embodiments, the snapshot tool 649 adds at least part of the metadata of the video clip 612 (e.g., metadata 214, FIG. 2) identifying the video clip 612 and a capture location (e.g., capture location 304, FIG. 3) thereof to indicate where the snapshot 662 was captured. When the user 124 views the snapshot 662 using the application 248, or another person views the snapshot 662 using similar software running on another device, the application 248 may, upon request by the user 624, retrieve the video clip 612 identified within the metadata of the snapshot 662 and play it on the display 650 of the client device 640 from a position just prior to where the snapshot 662 was captured, thereby providing context for the captured image.

Emergency Call Button

As described above for the embodiments of FIGS. 1 through 6, a user may submit a video evidence file to an agency, such as a law enforcement or insurance agency. However, when the user views a live video feed of an event, the user may immediately see that the event is urgent and would benefit from an immediate response by the agency. For example, where the live video feed shows a break-in in progress, an immediate response by the law enforcement agency may apprehend suspects and prevent theft. Where the live video feed shows excessive heat, smoke, or flames, an immediate response from a fire agency (e.g., a fire department) may prevent or lessen damage. One aspect of the present embodiments includes the realization that it would be beneficial to allow the user to report an emergency situation while watching the live video feed of an event captured by their security device. Where the user is near the event, it may be further advantageous to report the emergency silently, without having to verbally interact with an operator. For example, where the security device detects a break-in at the user's home while the user is at home, it may be advantageous to remain silent such that violence is not accidentally provoked.

Figure 7:
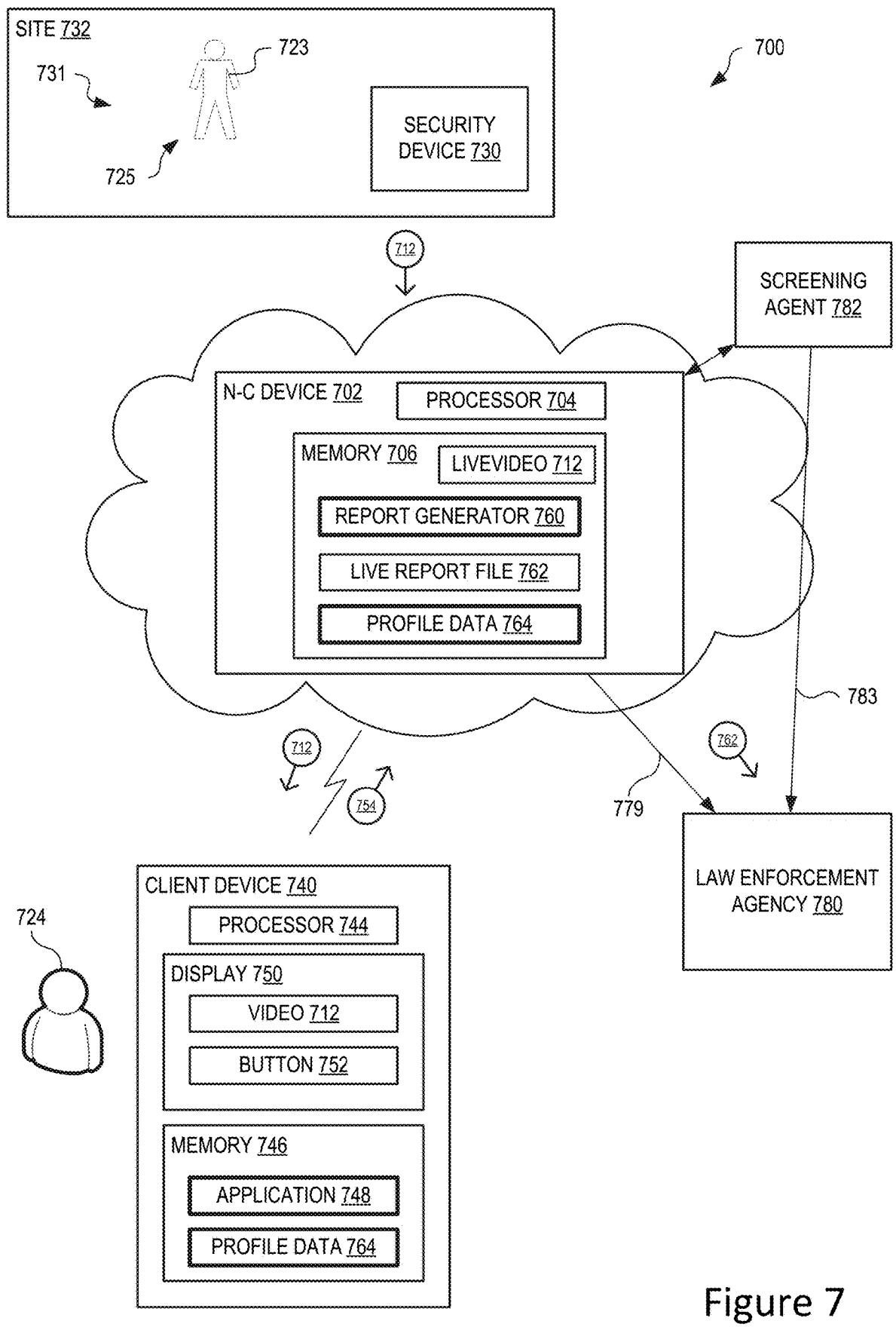
FIG. 7 is a functional block diagram illustrating one example system for reporting a live event to a law enforcement agency, in an embodiment.

FIG. 7 is a functional block diagram illustrating one example system 700 for reporting a live event 725 to a law enforcement agency 780. The system 700 is similar to the system 100 of FIGS. 1 and 2 and may include similar functionality thereto. The system 700 may include a network-connected device 702, located within the cloud for example, a security device 730 configured to monitor an environment 731 at a site 732, and a client device 740, that may be a smartphone or another computing device, of a user 724 that is associated with the security device 730. The user 724 may be an owner or responsible party of the security device 730 and/or site 732, for example.

The network-connected device 702 has a processor 704 communicatively coupled with a memory 706 and a report generator 760 that has machine-readable instructions stored within the memory 706 that, when executed by the processor 704, control the processor 704 to generate a live report file 762 in response to receiving a request 754 from the user 724 using the client device 740. When the security device 730 detects the live event 725 within the environment 731 (e.g., when a person 723 is detected within the environment 731), the security device 730 streams captured live video 712 of the environment 731 to a network-connected device 702. As described with reference to FIGS. 10 and 11, the network-connected device 702 may stream the live video 712 to the client device 740 for viewing by the user 724, allowing the user 724 to audibly interact with the person 723 if so desired. Thus, the user 724 may be able to watch the live event 725 as it occurs within the environment 731.

The client device 740 has a processor 744 communicatively coupled with a memory 746, a display 750, and an application 748 that has machine-readable instructions stored within the memory 746 that, when executed by the processor 744, control the processor 744 to display the live video 712 on the display 750. The client device 740, during display of the live video 712, may provide a report button 752, similar to the button 152 of FIGS. 1 and 2, that the user 724 may select to generate a live report file 762 containing information relevant to the live event 725. When the application 748 detects that the user 724 has selected the report button 752, the application 748 sends the request 754 to the network-connected device 702.

The live report file 762 is based upon information of the security device 730, including at least a geographic location (e.g., a postal address, a map reference, a latitude/longitude, GNSS coordinates, etc.) of the security device 730 and/or information of the user 724 (e.g., a name, address, telephone number, email address, and so on). In certain embodiments, the live report file 762 may include at least part of the live video 712. In certain embodiments, where the user 724 has captured one or more snapshots (e.g., see snapshots 662 and the snapshot tool 649 of FIG. 6) from the live video 712, these snapshots may be included within the live report file 762. The live report file 762 may thus include the geographic location of the live event 725 being reported (e.g., the geographic location of the security device 730), name and contact information of a responsible party (e.g., the user 724), and image evidence (e.g., the captured snapshot) of the live event 725. The live report file 762 may then be sent to a submission web address (e.g., a website) provided by a law enforcement agency 780. In certain embodiments, the live report file 762 is sent from the client device 740 to the law enforcement agency 780. In other embodiments, the live report file 762 is sent from the network-connected device 702 to the law enforcement agency 780. Accordingly, the live report file 762 provides the law enforcement agency with sufficient information to respond to the live event 725 appropriately.

In one embodiment, the report button 752 is overlaid on the video clip 112 being displayed on the client device 140, such that the user 724 may easily select the report button 752 upon seeing that the live event 725 is urgent and should be reported to the law enforcement agency 780.

In one embodiment, selection of the report button 752 by the user 724 causes the application 748 to show further controls on the display 750 that allows the user 724 to select an urgency of the live report file 762 as one of an emergency and a non-emergency. The selected urgency may indicate a level of response required by the law enforcement agency 780. For example, where the user 724 sees the person 723 breaking into a property at the site 732 in the live video, the user 724 may interact with the application 748 to indicate that the urgency of the live report file 762 is an emergency (e.g., a fast response to the live event 725 is critical). Accordingly, the law enforcement agency 780 may dispatch one or more officers to the geographic location of the security device 730, as defined within the live report file 762. In another example, where the user 724 sees that the person 723 is unknown and is walking around the site 732 and peering into windows, the user 724 interacts with the application 748 to indicate that the urgency of the live report file 762 is non-emergency (e.g., a fast response to the live event 725 is not required, but may be desired). Accordingly, the law enforcement agency 780 may review the live report file 762 for support when evaluating other live events within the same area.

In certain embodiments, the report generator 760 sends, via a security communication link 779 for example, the live report file 762 to the law enforcement agency 780 identified within profile data 764 associated with the security device 730. The profile data 764 may provide contact information of the law enforcement agency 780 that is known to include the geographic location of the security device 730 within its operating vicinity. In another embodiment, the report generator 760 retrieves contact information of the law enforcement agency 780 from a third party (e.g., a database or service) based upon the geographic location of the security device 730 as defined by account information associated with the security device 730. In one embodiment, the application 748 allows the user 724 to use the client device 740 to configure the profile data 764 associated with the security device 730 with contact information of the law enforcement agency 780. For example, the user 724 may add contact information for a police station that is located nearest to the geographic location of the security device 730.

Accordingly, the user 724 may report the live event 725 within the live video 712 without needing to speak (or make any other noise), and thus the reporting may be achieved silently. Advantageously, where the user 724 is proximate the live event (e.g., where the user 724 is at a residence configured with the security device 730 detecting the live event 725), the user may raise the alarm without indicating their presence at the live event 725 (e.g., to an intruder).

In one embodiment, the system 700 may also include a screening agency 782, in communication with the network-connected device 702, to evaluate the live report file 762 prior to it being communicated to the law enforcement agency 780. For example, when the user 742 instructs the client device 740 to send the live report file 762 with the urgency set to emergency, the report generator 760 may first send the live video 712 to the screening agency 782 for evaluation; the screening agency 782 sending, as indicated by arrow 783, the live report file 762 to the law enforcement agency 780 only when the screening agency 782 indicates that the urgency of the live report file 762 is authenticated and/or legitimate. In one example of operation, where the screening agency 782 determines that the urgency of the live report file 762 is not authentic and/or legitimate, the screening agency 782 may interact with the user 742, via the client device 740 for example, to further evaluate circumstances corresponding to the live event 725 and/or the live report file 762. The screening agency 782 may be, for example, an authorized operator using a terminal capable of displaying the live video and contents of the live report file 762.

Figure 8:
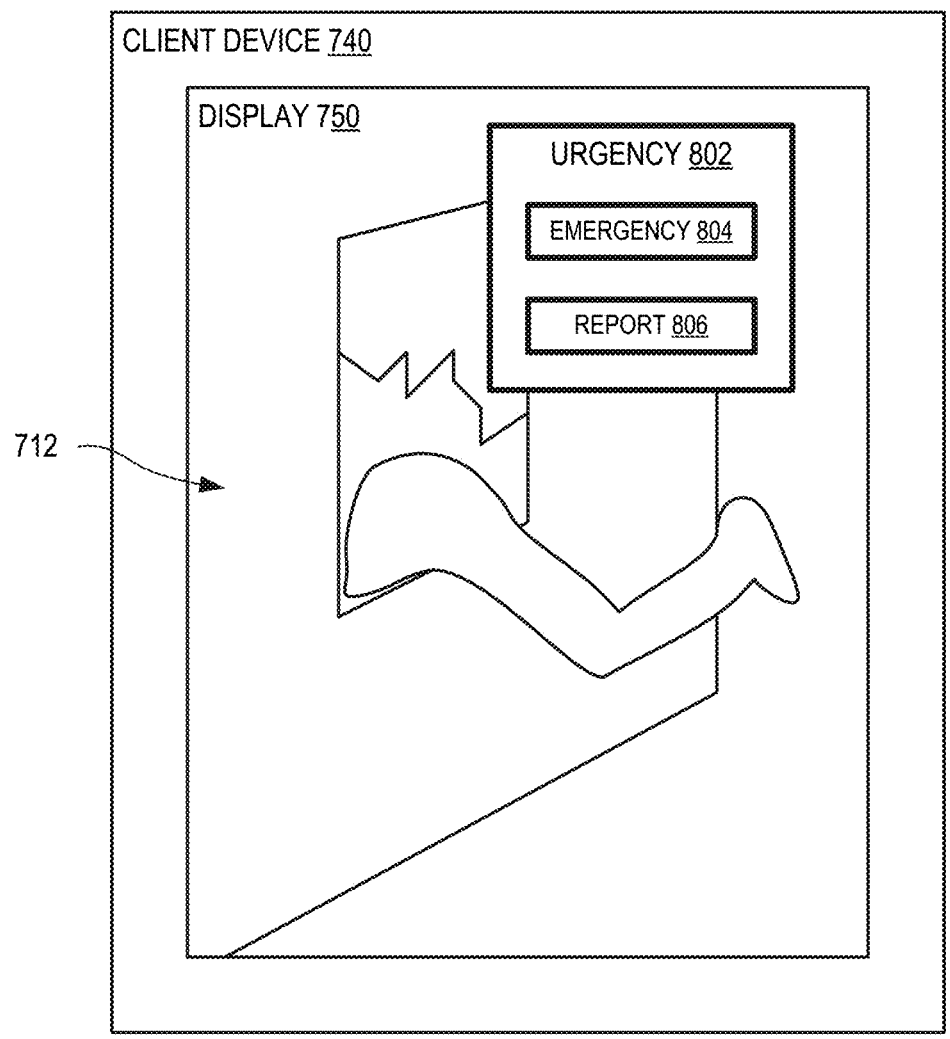
FIG. 8 is a schematic diagram illustrating the client device of FIG. 7 displaying the live video overlaid with an urgency dialog, in an embodiment.

FIG. 8 shows the client device 740 of FIG. 7 displaying the live video 712 overlaid with an urgency dialog 802 that allows the user 724 to select between an emergency reporting button 804 and a non-emergency reporting button 806. As illustrated, the user 724 remains apprised of events within the live video 712 while reporting the emergency by simply selecting the emergency button 804.

Figure 9:
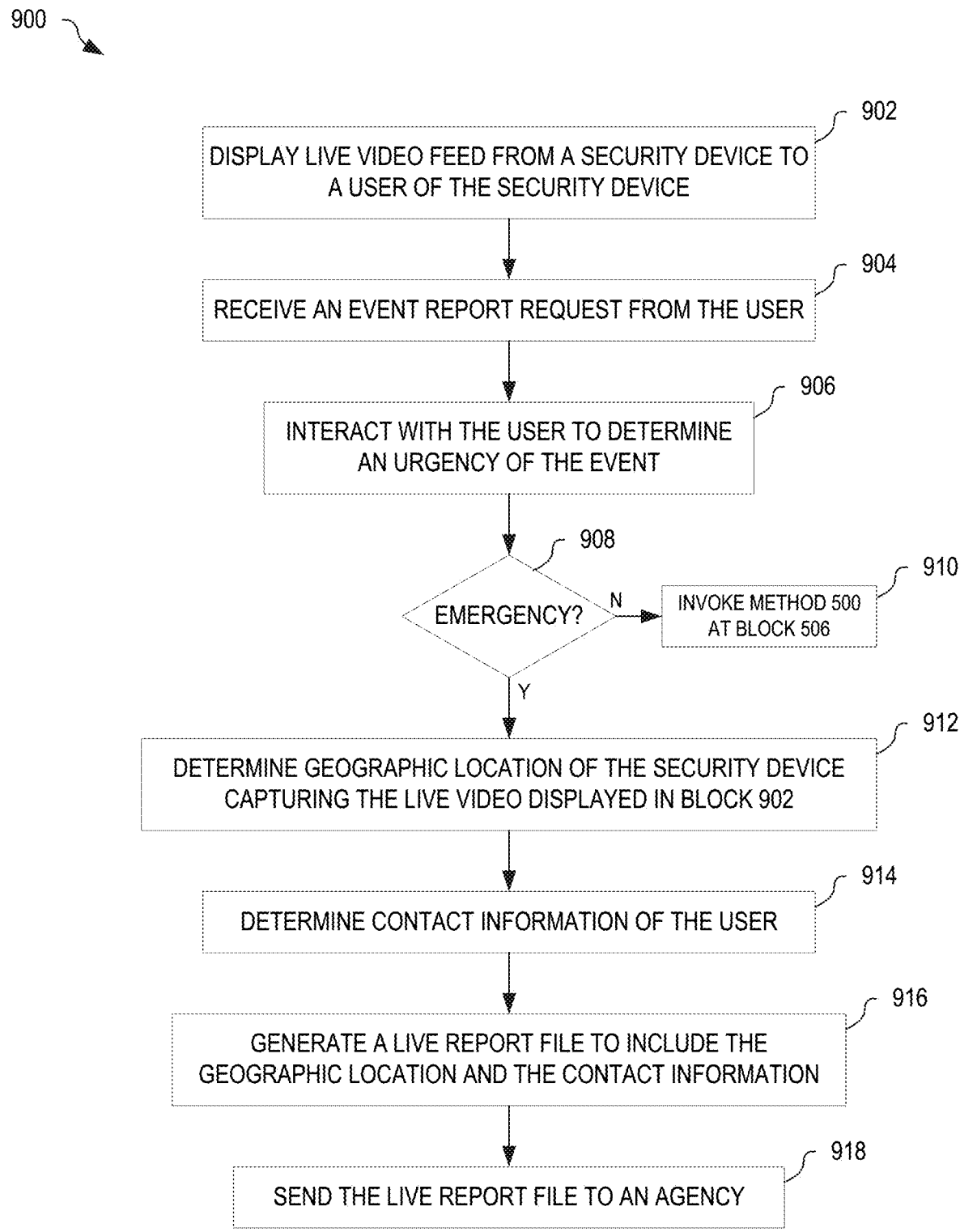
FIG. 9 is a flowchart illustrating one example method for reporting an emergency during display of a live video captured by a security device, in an embodiment.

FIG. 9 is a flowchart illustrating one example method 900 for reporting an emergency during display of a live video captured by a security device. The method 900 may be, for example, implemented, at least in part, within the report generator 760 of FIG. 7, and at least in part within the application 748. In certain embodiments, the method 900 may be implemented entirely within the application 748.

In block 902, the method 900 displays live video captured by a security device to a user of the security device. In one example of block 902, the network-connected device 702 sends the live video 712, captured by the security device 730, to the client device 740 for display to the user 724.

In block 904, the method 900 receives an event report request from the user. In one example of block 904, the application 748 receives an indication of the user 724 selecting the report button 752 on the display 750 of the client device 740. In block 906, the method 900 interacts with the user to determine an urgency of the event. In one example of block 906, the application 748 displays the urgency dialog 802 over the live video 712 on the display 750.

Block 908 is a decision. If, in block 908, the method 900 determines that the user has selected emergency, the method 900 continues with block 912; otherwise, the method 900 continues with block 910 and may invoke the method 500 of FIG. 5 at block 506 to report the live event 725 with less urgency. In one example of block 908, when the user 724 selects the emergency button 804, the method 900 continues with block 912.

In block 912, the method 900 determines a geographic location of the security device capturing the live video displayed in block 902. In one example of block 912, the application 748 retrieves a geographic location of the security device 730 from the profile data 764 within the memory 746. In another example of block 912, the application 748 communicates with the report generator 760 to determine a geographic location of the security device 730 from the profile data 764 within the memory 706. In block 914, the method 900 determines contact information of the user. In one example of block 914, the application 748 determines contact information of the user 724 from the profile data 764 within the memory 746. In another example of block 914, the application 748 communicates with the report generator 760 to determine contact information of the user 724 from the profile data 764 within the memory 706.

In block 916, the method 900 generates a live report file to include the geographic location and the contact information. In one example of block 916, the application 748 invokes the report generator 760 to include the geographic location and the contact information within the live report file 762. The report generator 760 may also include one or more captured images from the live video 712, where indicated (e.g., by tapping the display 750) by the user 724.

In block 918, the method 900 sends the live report file to an agency. In one example of block 918, the report generator 760 sends the live report file 762 to the law enforcement agency 780. In another example of block 918, the report generator 760 sends the live report file 762 to the screening agency 782.

As discussed above, one aspect of the present embodiments includes the realization that many security devices, such as those installed at residential and office properties, have cameras that capture video clips that may contain evidence of crimes or other events, but it can be difficult for users of these security devices to provide these video clips to law enforcement agencies and/or insurance agencies when needed. This difficulty can be compounded by the fact that the user may be in a traumatized state as a result of the event (e.g., a home break-in, vandalism, car theft, and so on). The present embodiments solve this problem by providing a convenient way for an owner (or user) of the security device to quickly and easily prepare a video evidence file for these agencies with any video clip that contains relevant evidence.

Another aspect of the present embodiments includes the realization that a law enforcement agency or an insurance agency may require video evidence to be submitted in a standardized way so that the agency may receive and process the video evidence. The present embodiments solve this problem by providing a file format for a video evidence file that includes at least some of: a video clip captured by a security device, additional information about the video clip such as a capture location, a timestamp of when the video clip was captured, a unique identity of the security device that captured the video clip, a summary describing the content of the video clip, and a digital signature of the owner indicative of the veracity of the information contained within the video evidence file. Advantageously, by facilitating submission of video evidence in a consistent format, agencies will be able to efficiently use the video evidence, thereby making it easier for law enforcement to solve crimes and apprehend perpetrators, and resulting in faster resolution of insurance claims.

Also as discussed above, another aspect of the present embodiments includes the realization that a live report file corresponding to a live event may be marked as an emergency such that law enforcement agency may respond immediately. Advantageously, the live report file may be quickly and silently generated by a user watching a live video stream of the live event to include a location of the live event and image and/or video evidence that allows responders to be more informed.

A/V Recording and Communication Device

Figure 10:
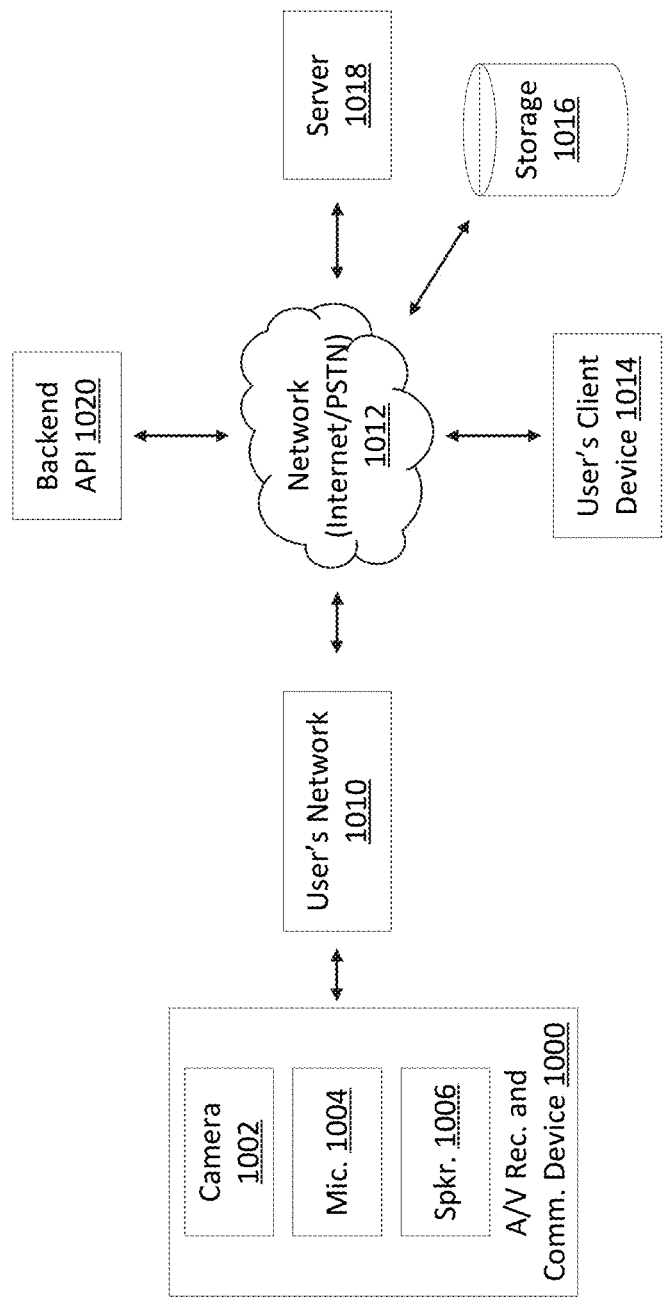
FIG. 10 is a functional block diagram illustrating a system for streaming and storing audio/video (A/V) content captured by a device, according to an embodiment.

With reference to FIG. 10, the present embodiments include an A/V recording and communication device 1000, also known as a security device 1000. A/V recording and communication device 1000 may represent security device 130, 730 of FIGS. 1 and 7, respectively, wherein security device 130, 730 may include functionality of A/V recording and communication device 1000. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without a front button and related components.

The A/V recording and communication device 1000 may be located near the entrance to a structure (not shown), such as a dwelling, a business, a storage facility, etc. The A/V recording and communication device 1000 includes a camera 1002, a microphone 1004, and a speaker 1006. The camera 1002 may include, for example, a high definition (HD) video camera, such as one configured for capturing video images at an image display resolution of 720p, or 1080p, or better. While not shown, the A/V recording and communication device 1000 may also include other hardware and/or components, such as a housing, a communication module (which may facilitate wired and/or wireless communication with other devices), one or more motion sensors (and/or other types of sensors), a button, etc. The A/V recording and communication device 1000 may further include similar componentry and/or functionality as the wireless communication doorbells described in U.S. Pat. No. 9,584,775 and US Patent Publication Number 2015/0022618 (application Ser. No. 14/334,922), both of which are incorporated herein by reference in their entireties.

With further reference to FIG. 10, the A/V recording and communication device 1000 communicates with a user's network 1010, which may be for example a wired and/or wireless network. If the user's network 1010 is wireless, or includes a wireless component, the network 1010 may be a Wi-Fi network compatible with the IEEE 802.11 standard and/or other wireless communication standard(s). The user's network 1010 is connected to another network 1012, which may comprise, for example, the Internet and/or a public switched telephone network (PSTN). As described below, the A/V recording and communication device 1000 may communicate with the user's client device 1014 via the user's network 1010 and the network 1012 (Internet/PSTN). The user's client device 1014 may comprise, for example, a mobile telephone (may also be referred to as a cellular telephone), such as a smartphone, a personal digital assistant (PDA), or another communication device. The user's client device 1014 comprises a display (not shown) and related components configured for displaying streaming and/or recorded video images. The user's client device 1014 may also comprise a speaker and related components configured for broadcasting streaming and/or recorded audio, and may also comprise a microphone. The A/V recording and communication device 1000 may also communicate with one or more remote storage device(s) 1016 (may be referred to interchangeably as "cloud storage device(s)"), one or more servers 1018, and/or an API (application programming interface) 1020 via the user's network 1010 and the network 1012 (Internet/PSTN). While FIG. 10 illustrates the storage device 1016, the server 1018, and the API 1020 as components separate from the network 1012, it is to be understood that the storage device 1016, the server 1018, and/or the API 1020 may be considered to be components of the network 1012.

The network 1012 may be any wireless network or any wired network, or a combination thereof, configured to operatively couple the above-mentioned modules, devices, and systems as shown in FIG. 10. For example, the network 1012 may include one or more of the following: a PSTN, the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g., LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11- based radio frequency network. The network 1012 may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

In certain embodiments, when a person (may be referred to interchangeably as "visitor") arrives at the A/V recording and communication device 1000, the A/V recording and communication device 1000 detects the visitor's presence and begins capturing video images within a field of view of camera 1002. The A/V recording and communication device 1000 may also capture audio through microphone 1004. The A/V recording and communication device 1000 may detect the visitor's presence by detecting motion using the camera 1002 and/or a motion sensor, and/or by detecting that the visitor has pressed a front button of the A/V recording and communication device 1000 (for example, when the A/V recording and communication device 1000 is a doorbell).

In response to the detection of the visitor, the A/V recording and communication device 1000 sends an alert to the user's client device 1014 (FIG. 10) via the user's network 1010 and the network 1012. The A/V recording and communication device 1000 also sends streaming video, and may also send streaming audio, to the user's client device 1014. If the user answers the alert, two-way audio communication may then occur between the visitor and the user through the A/V recording and communication device 1000 and the user's client device 1014. The user may view the visitor throughout the duration of the call, but the visitor cannot see the user (unless the A/V recording and communication device 1000 includes a display, which it may in certain embodiments).

The video images captured by the camera 1002 of the A/V recording and communication device 1000 (and the audio captured by the microphone 1004) may be uploaded to the cloud and recorded on the remote storage device 1016 (FIG. 10). In some embodiments, the video and/or audio may be recorded on the remote storage device 1016 even if the user chooses to ignore the alert sent to the user's client device 1014.

With further reference to FIG. 10, the system may further include an API 1020 including one or more components. An API (application programming interface) may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. An API may, for example, comprise many such applications, each of which communicate with one another using their public APIs. In some embodiments, the API may hold the bulk of the user data and offer the user management capabilities, leaving the clients to have very limited state.

The API 1020 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The API 1020 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 11:
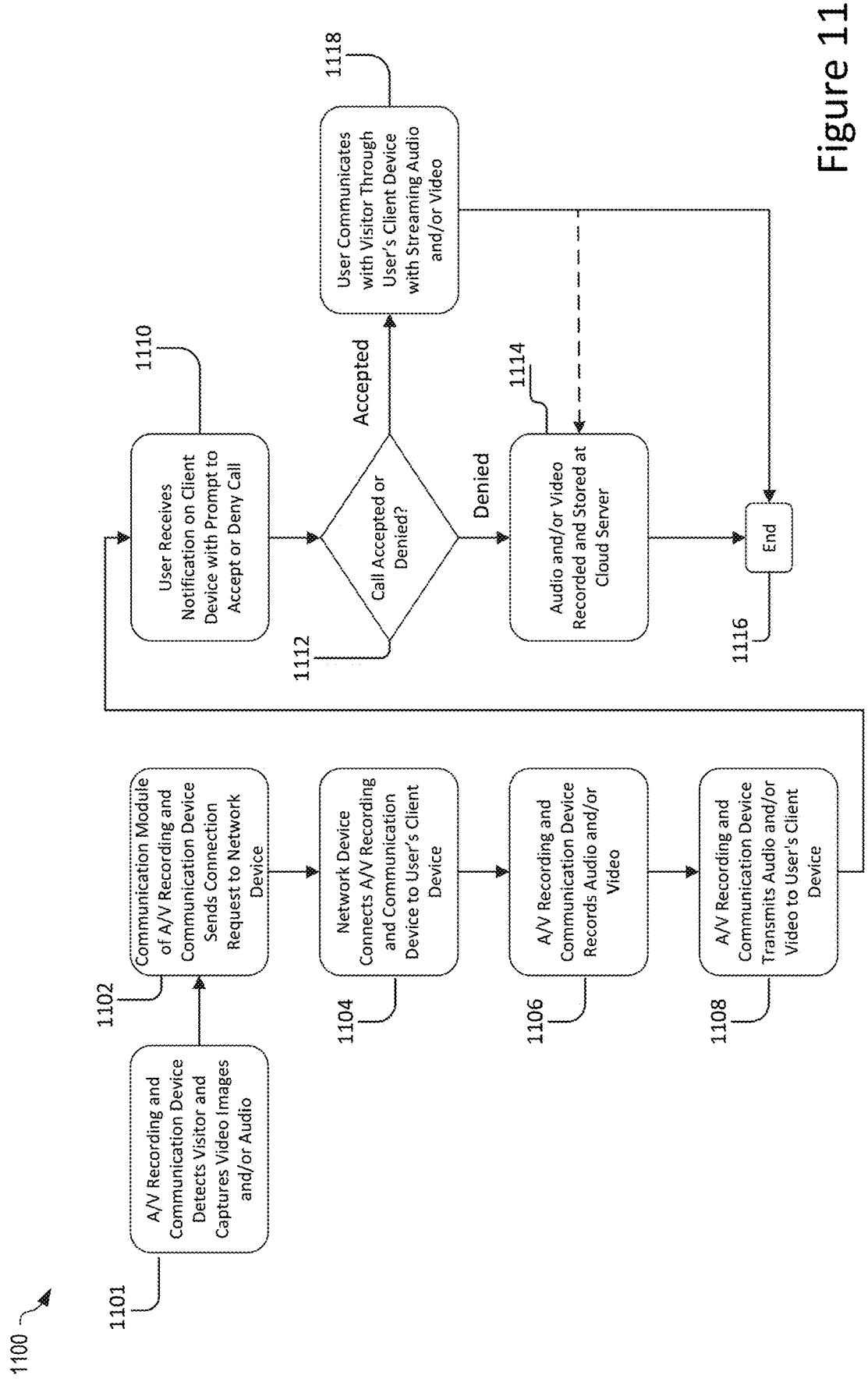
FIG. 11 is a flowchart illustrating a process for streaming and storing A/V content from the device of FIG. 10, according to an embodiment.

FIG. 11 is a flowchart illustrating a process 1100 for streaming and storing A/V content from the A/V recording and communication device 1000, in an embodiment. At block 1101, the A/V recording and communication device 1000 detects the visitor's presence and captures video images within a field of view of the camera 1002. The A/V recording and communication device 1000 may also capture audio through the microphone 1004. As described above, the A/V recording and communication device 1000 may detect the visitor's presence by detecting motion using the camera 1002 and/or a motion sensor, and/or by detecting that the visitor has pressed a front button of the A/V recording and communication device 1000 (for example, when the A/V recording and communication device 1000 is a doorbell). Also as described above, the video recording/capture may begin when the visitor is detected, or may begin earlier, as described below.

At block 1102, a communication module of the A/V recording and communication device 1000 sends a connection request, via the user's network 1010 and the network 1012, to a device in the network 1012. For example, the network device to which the connection request is sent may be a server such as the server 1018. The server 1018 may include a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the API 1020, which is described above.

In response to the request, at block 1104 the network device may connect the A/V recording and communication device 1000 to the user's client device 1014 through the user's network 1010 and the network 1012. At block 1106, the A/V recording and communication device 1000 may record available audio and/or video data using the camera 1002, the microphone 1004, and/or any other device/sensor available. At block 1108, the audio and/or video data is transmitted (streamed) from the A/V recording and communication device 1000 to the user's client device 1014 via the user's network 1010 and the network 1012. At block 1110, the user may receive a notification on the user's client device 1014 with a prompt to either accept or deny the call.

At block 1112, the process 1100 determines whether the user has accepted or denied the call. If the user denies the notification, then the process 1100 advances to block 1114, where the audio and/or video data is recorded and stored at a cloud server. The session then ends at block 1116 and the connection between the A/V recording and communication device 1000 and the user's client device 1014 is terminated. If, however, the user accepts the notification, the process 1100 proceeds with block 1118 where the user communicates with the visitor through the user's client device 1014 while audio and/or video data captured by the camera 1002, the microphone 1004, and/or other devices/sensors, is streamed to the user's client device 1014. At the end of the call, the user may terminate the connection between the user's client device 1014 and the A/V recording and communication device 1000 and the session ends at block 1116. In some embodiments, the audio and/or video data may be recorded and stored at a cloud server (block 1114) even if the user accepts the notification and communicates with the visitor through the user's client device 1014.

Figure 12:
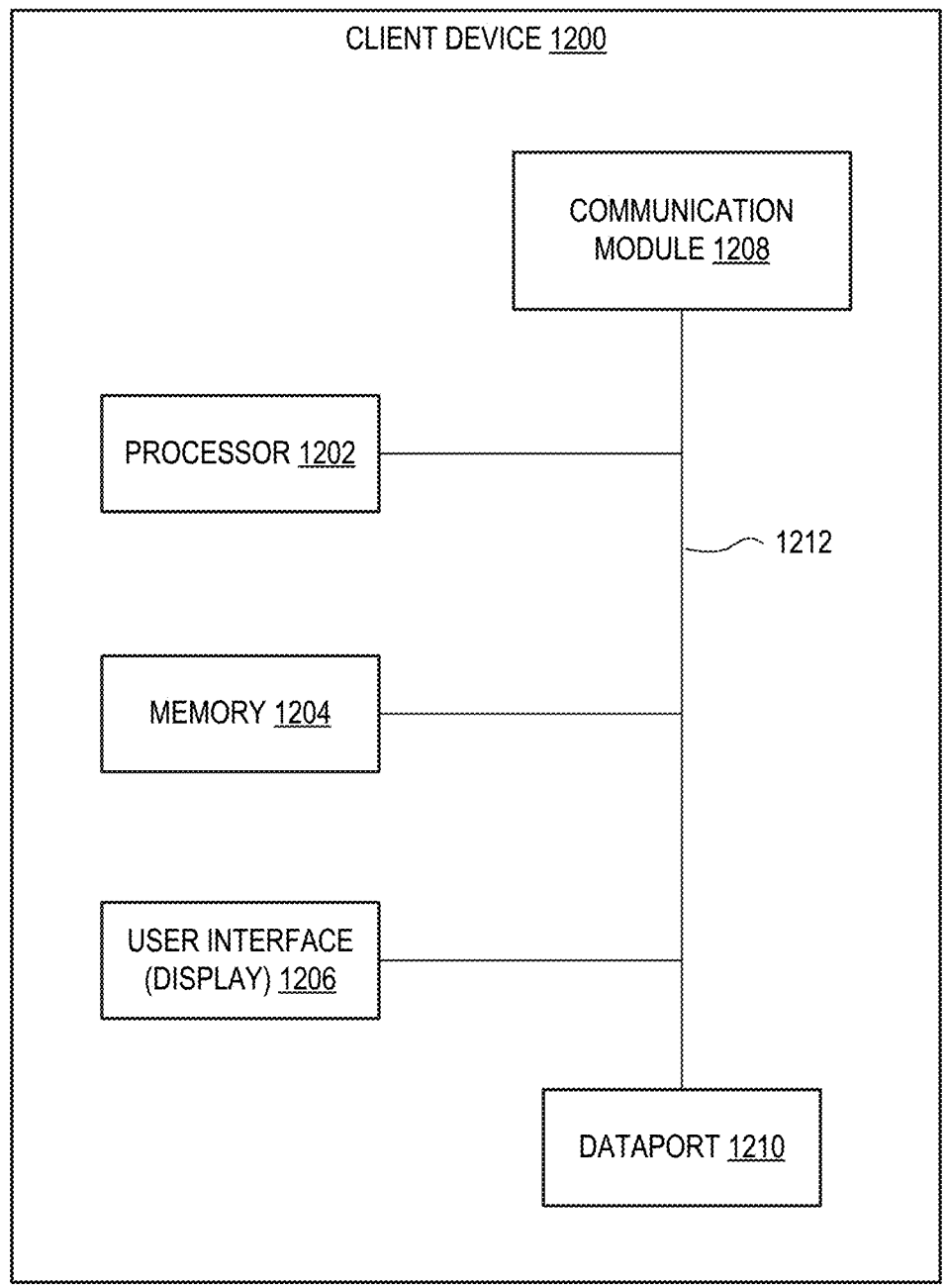
FIG. 12 is a functional block diagram of a client device on which the present embodiments may be implemented according to various aspects of the present disclosure.

FIG. 12 is a functional block diagram of a client device 1200 on which the present embodiments may be implemented according to various aspects of the present disclosure. The user's client device 1014 described with reference to FIG. 10 may include some or all of the components and/or functionality of the client device 1200. The client device 1200 may be, for example, a smartphone.

The client device 1200 includes a processor 1202, a memory 1204, a user interface 1206, a communication module 1208, and a dataport 1210. These components are communicatively coupled together by an interconnect bus 1212. The processor 1202 may include any processor used in smartphones and/or portable computing devices, such as an ARM processor (a processor based on the RISC (reduced instruction set computer) architecture developed by Advanced RISC Machines (ARM).). In certain embodiments, the processor 1202 includes one or more other processors, such as one or more microprocessors, and/or one or more supplementary co-processors, such as math co-processors.

The memory 1204 may include both operating memory, such as random access memory (RAM), as well as data storage, such as read-only memory (ROM), hard drives, flash memory, or any other suitable memory/storage element. The memory 1204 may include removable memory elements, such as a CompactFlash card, a MultiMediaCard (MMC), and/or a Secure Digital (SD) card. In certain embodiments, the memory 1204 includes a combination of magnetic, optical, and/or semiconductor memory, and may include, for example, RAM, ROM, flash drive, and/or a hard disk or drive. The processor 1202 and the memory 1204 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1202 may be connected to the memory 1204 via the dataport 1210.

The user interface 1206 may include any user interface or presentation elements suitable for a smartphone and/or a portable computing device, such as a keypad, a display screen, a touchscreen, a microphone, and a speaker. The communication module 1208 is configured to handle communication links between the client device 1200 and other, external devices or receivers, and to route incoming/outgoing data appropriately. For example, inbound data from the dataport 1210 may be routed through the communication module 1208 before being directed to the processor 1202, and outbound data from the processor 1202 may be routed through the communication module 1208 before being directed to the dataport 1210. The communication module 1208 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1210 may be any type of connector used for physically interfacing with a smartphone and/or a portable computing device, such as a mini-USB port or an IPHONE®/IPOD® 30-pin connector or LIGHTNING® connector. In other embodiments, the dataport 1210 may include multiple communication channels for simultaneous communication with, for example, other processors, servers, and/or client terminals.

Figure 13:
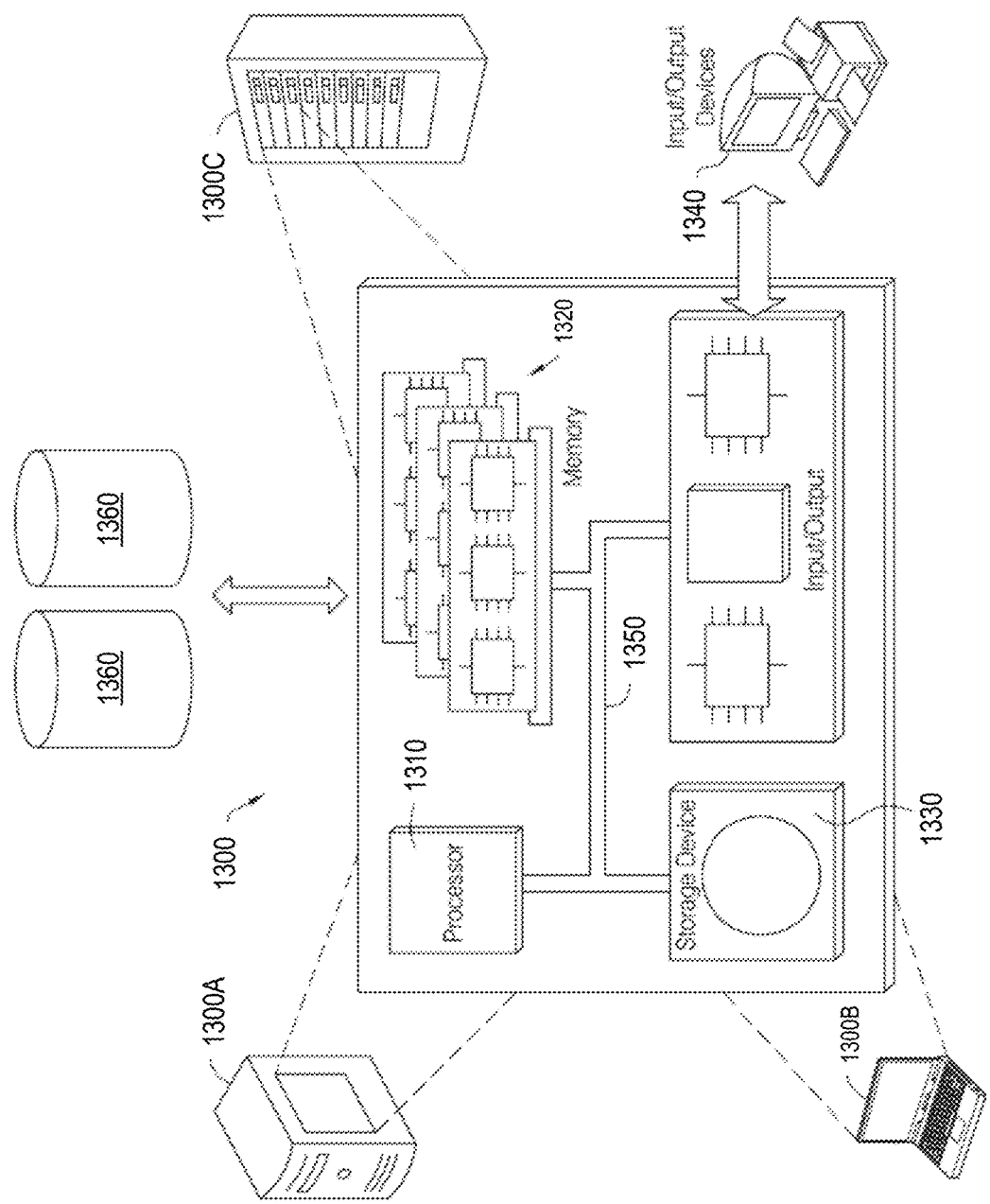
FIG. 13 is a functional block diagram of a system on which the present embodiments may be implemented according to various aspects of present disclosure.

The memory 1204 may store instructions for communicating with other systems, such as a computer. The memory 1204 may store, for example, a program (e.g., computer program code) adapted to direct the processor 1202 in accordance with the present embodiments. The instructions also may include program elements, such as an operating system. While execution of sequences of instructions in the program causes the processor 1202 to perform the process steps described herein, hard-wired circuitry may be used in place of, or in combination with, software/firmware instructions for implementation of the processes of the present embodiments. Thus, the present embodiments are not limited to any specific combination of hardware and software. System/Device FIG. 13 is a functional block diagram of a system 1300 on which the present embodiments may be implemented according to various aspects of the present disclosure. For example the system 1300 may represent one or more of the network-connected device 102 of FIG. 1, the security device 130, the client device 140, the data store 216 of FIG. 2, the client device 640 of FIG. 6, and the client device 740 of FIG. 7. The computer system 1300 may be embodied in at least one of a personal computer (also referred to as a desktop computer) 1300A, a portable computer (also referred to as a laptop or notebook computer) 1300B, and/or a server 1300C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1300 may execute at least some of the operations described above. The computer system 1300 may include at least one processor 1310, a memory 1320, at least one storage device 1330, and input/output (I/O) devices 1340. Some or all of the components 1310, 1320, 1330, 1340 may be interconnected via a system bus 1350. The processor 1310 may be single- or multi-threaded and may have one or more cores. The processor 1310 may execute instructions, such as those stored in the memory 1320 and/or in the storage device 1330. Information may be received and output using one or more of the I/O devices 1340.

The memory 1320 may store information, and may be a computer-readable medium, such as volatile or non-volatile memory. The storage device(s) 1330 may provide storage for the computer system 1300, and may be a computer-readable medium. In various embodiments, the storage device(s) 1330 may be one or more of a flash memory device, a hard disk device, an optical disk device, a tape device, or any other type of storage device.

The I/O devices 1340 may provide input/output operations for the computer system 1300. The I/O devices 1340 may include a keyboard, a pointing device, and/or a microphone. The I/O devices 1340 may further include a display unit for displaying graphical user interfaces, a speaker, and/or a printer. External data may be stored in one or more accessible external databases 1360.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

Example Embodiments

Figure 14:
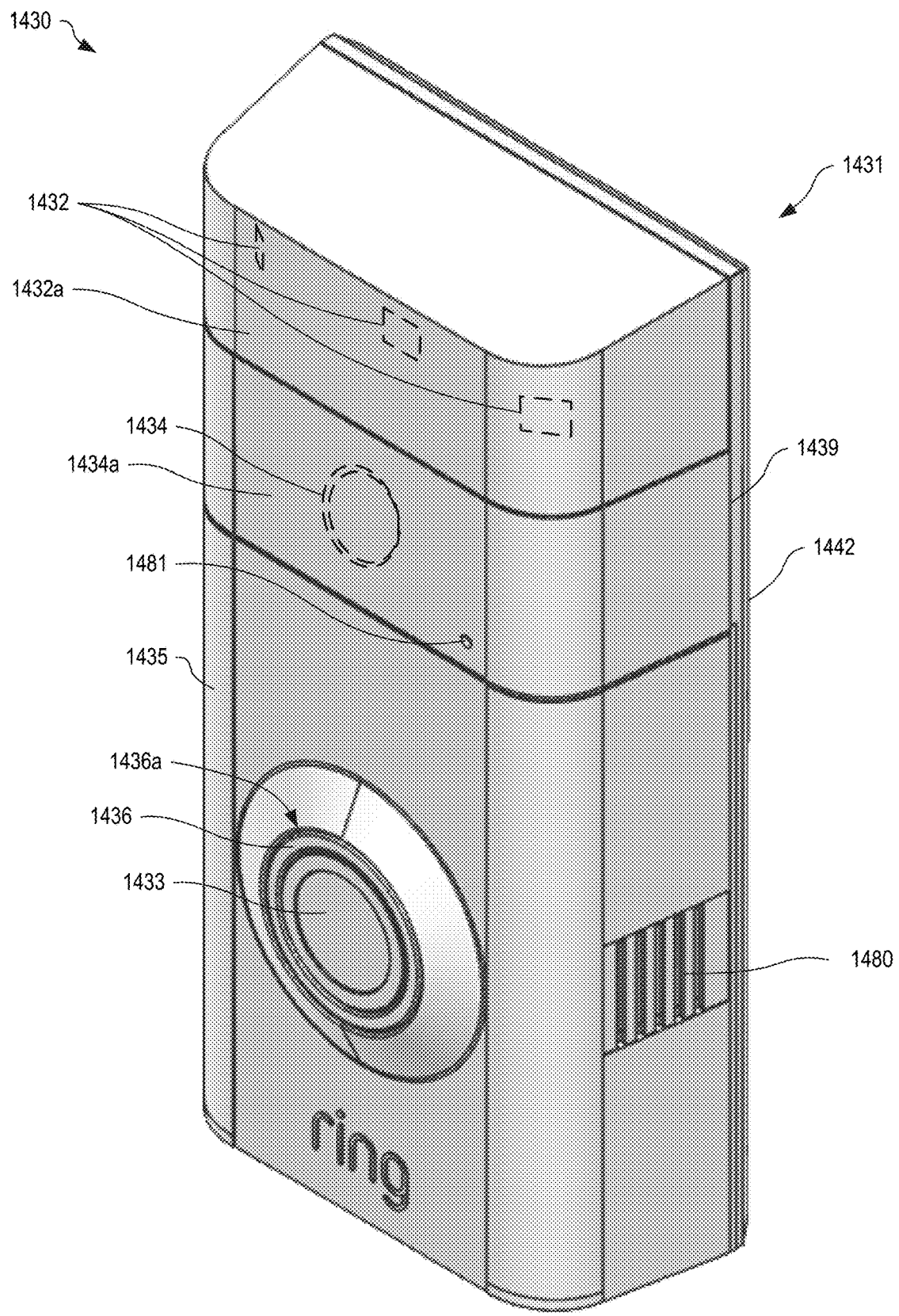
FIG. 14 is a front perspective view of the device of FIG. 10 implemented as a doorbell, in an embodiment.

FIG. 14 is a front perspective view of a doorbell 1430 that represents one example implementation of the security devices 130, 730, and 1000 of FIGS. 1, 7, and 10, respectively, hereafter referred to as device 1430. The device 1430 has a housing 1431 that includes a backplate 1439, a faceplate 1435 with a button 1433, an optically-transparent lens 1434a positioned in front of a camera 1434, and an infrared-transparent lens 1432a positioned in front of at least one motion sensor 1432. The housing 1431 may be further configured with an aperture 1481 to allow sound to enter the housing 1431 for detection by a microphone. The device 1430 may also include a mounting bracket 1442 that couples with the backplate 1439 to facilitate mounting of the device 1430 on a flat surface, such as the exterior of a building, such as a home or office. For example, the mounting bracket 1442 may be selected for mounting to surfaces of various composition, including, without limitation, wood, concrete, stucco, brick, vinyl siding, aluminum siding, etc., with any suitable fasteners, such as screws, or interference connections, adhesives, etc. The device 1430 may couple to the mounting bracket 1442 using any suitable fasteners, such as screws, or interference connections, mating hooks and apertures, adhesives, etc. The backplate 1439 may include screw terminals configured to receive electrical wires adjacent a mounting surface of the device 1430. The device 1430 may receive electrical power through the screw terminals and/or the device 1430 may control electrical connectivity of the screw terminals to cause a conventional doorbell to sound if so connected to the wires.

The faceplate 1435 may extend from the bottom of the device 1430 up to just below the camera 1434. The faceplate 1435 may be formed of any suitable material, including, without limitation, metals, such as brushed aluminum or stainless steel, metal alloys, and plastics, and any combination thereof. The faceplate 1435 protects the internal contents of the device 1430 and serves as an exterior front surface of the device 1430. The faceplate 1435 may include an aperture 1436a with a flexible translucent membrane 1436 for movably holding the button 1433. The faceplate 1435 is also formed with at least one speaker grille 1480 to allow sound generated within the housing 1431 to exit. The button 1433 and the flexible translucent membrane 1436 may have various profiles that may or may not match the profile of the faceplate 1435. The flexible translucent membrane 1436 may comprise any suitable material, including, without limitation, a transparent silicone, plastic, or rubber, that is configured for allowing light produced within the device 1430 to pass through and is sufficiently flexible to allow the button 1433 to be pressed. The light may be produced by one or more light-emitting components, such as light-emitting diodes (LEDs), contained within the device 1430, as further described below. The button 1433 and/or the flexible translucent membrane 1436 contacts a switch cover located within the device 1430 when the button 1433 is pressed by a visitor. When pressed, the button 1433 may trigger one or more functions of the device 1430, as further described below.

The motion sensor 1432 may be, for example, one or more passive infrared (PIR) sensors that detect motion using the infrared wavelength, but may be any type of sensor configured for detecting and communicating the presence of motion and/or a heat source within their field of view. The motion sensor 1432 may be configured to detect motion using any methodology, including but not limited to methodologies that do not rely on detecting the presence of a heat source within a field of view, without departing from the scope of the present embodiments. In certain embodiments, the infrared-transparent lens 1432a may be a Fresnel lens patterned to focus incoming light onto the at least one motion sensor 1432 located within the device 1430. The infrared transparent lens 1432a may be substantially coplanar with a front surface of the housing 1431. In alternative embodiments, the infrared-transparent lens 1432a may be recessed within the housing 1431 or may protrude outward from the housing 1431. The infrared-transparent lens 1432a may extend and curl partially around the side of the device 1430 without departing from the scope of the present embodiments. The at least one motion sensor 1432 is configured to sense a presence and/or motion of an object in front of the device 1430. In certain embodiments, the optically-transparent lens 1434a may be configured for focusing light into the camera 1434 so that clear images may be taken. The camera 1434 is configured for capturing video data when activated.

Floodlight Embodiment

Figure 15:
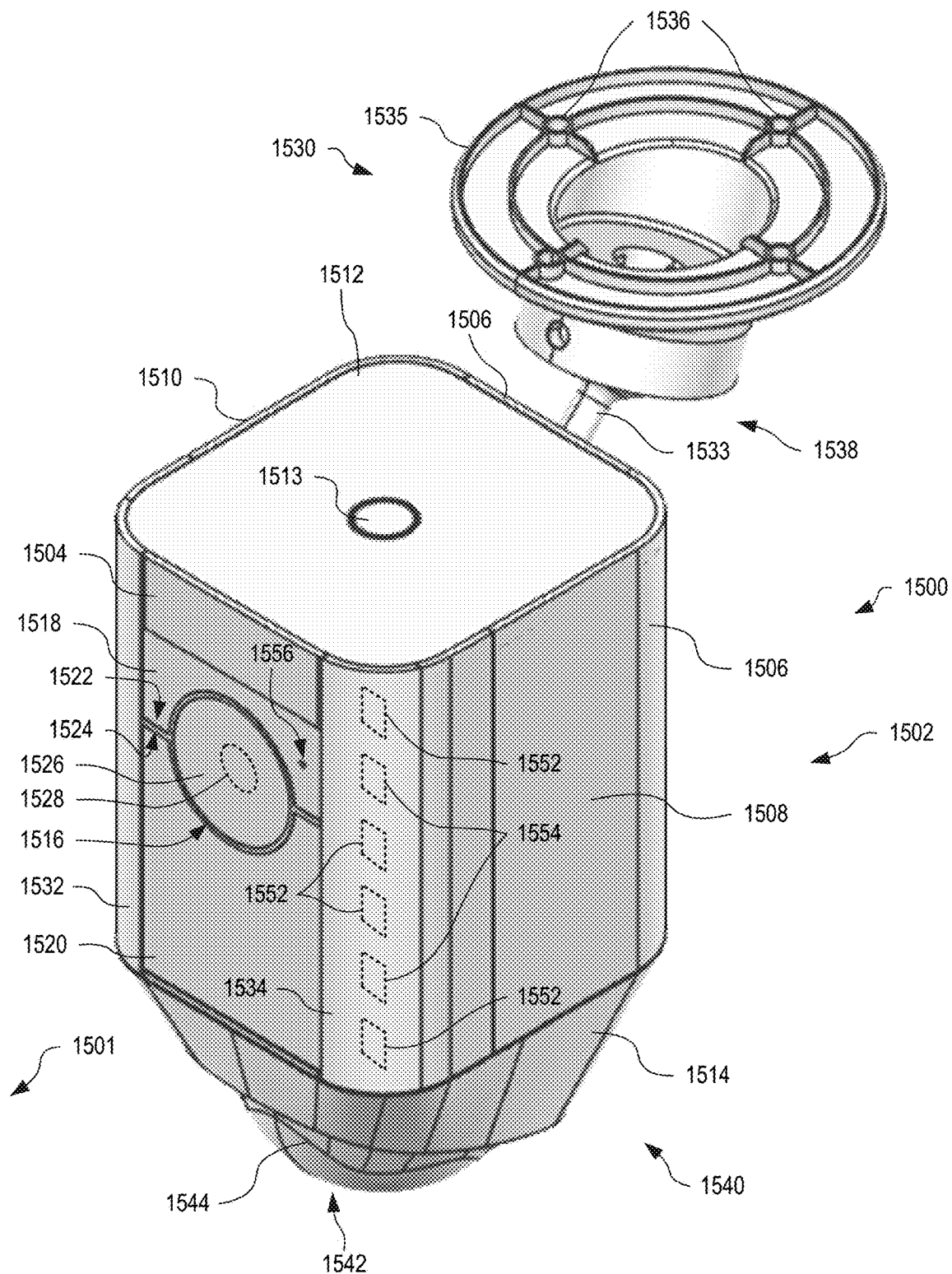
FIG. 15 is a front perspective view of the device of FIG. 10 implemented as a security/floodlight controlling device, in an embodiment, in combination with mounting hardware.

FIG. 15 is a front perspective view of a security device 1500, that represents one example implementation of the security devices 130, 730, and 1000 of FIGS. 1, 7, and 10, respectively.

The security device 1500 is configured with a housing 1502 for containing and protecting the interior components of the security device 1500. The housing 1502 includes a front wall 1504, a rear wall 1506, opposing sidewalls 1508 (right), 1510 (left), an upper wall 1512, and a tapered lower portion 1514. The front wall 1504 forms a central opening 1516 that receives an upper shield 1518 and a lower grille 1520. In the illustrated embodiment, front surfaces of the upper shield 1518 and the lower grille 1520 are substantially flush with a front surface of the front wall 1504, but in alternative embodiments, these surfaces may not be flush with one another. The upper shield 1518 is substantially rectangular with a semicircular indentation along its lower edge 1522. The lower grille 1520 is substantially rectangular, and includes a semicircular indentation along its upper edge 1524. Together, the semicircular indentations in the upper shield 1518 and the lower grille 1520 form a circular opening that accommodates a cover 1526. The upper shield 1518, the lower grille 1520, and the cover 1526 are described in further detail below.

A camera 1528 is positioned behind the cover 1526 with a field of view of a monitored area 1501 to the front of the security device 1500 through the circular opening formed by the upper shield 1518 and the lower grille 1520. The cover 1526 is preferably transparent or translucent so that it does not interfere with the field of view of the camera 1528. For example, in certain embodiments the cover 1526 may comprise colorless glass or plastic.

The security device 1500 has a plurality of visible light emitting elements 1552 and infrared light emitting elements 1554 that are positioned behind right and left front corner shields 1532, 1534. For clarity of illustration, the visible light emitting elements 1552 and the infrared light emitting elements 1554 are shown only behind right corner shield 1534; the visible light emitting elements 1552 and the infrared light emitting elements 1554 are similarly positioned behind the left corner shield 1532. The corner shields 1532, 1534 may be formed of a material that is transparent to light within both the visible spectrum and the infrared spectrum. In certain embodiments, the corner shields 1532, 1534 are formed of a clear plastic (e.g., polycarbonate) or glass. The corner shields 1532, 1534, therefore, do not significantly interfere with transmission of light from the visible light emitting elements 1552 and the infrared light emitting elements 1554 into the monitored area 1501. The infrared light emitting elements 1554, in conjunction with operation of the camera 1528, facilitates night vision functionality of the security device 1500.

An input device 1513 is positioned on the upper wall 1512 of the housing 1502 such that it is accessible by the user. The input device 1513 may be, for example, a button connected to an electrical switch that provides an input to a processor of security device 1500.

The security device 1500 includes at least two microphones. The first microphone is positioned at the front of the security device 1500 and is aligned with a first microphone aperture 1556 within the upper shield 1518. The second microphone is positioned at the left side of the security device 1500 and is aligned with a second microphone aperture in the left sidewall 1510 of the housing 1502.

The tapered lower portion 1514 includes an opening to receive the motion sensor cover 1544, which is convexly shaped to cover and close the lower end opening of the tapered lower portion 1514. The motion sensor cover 1544 may include a Fresnel lens 1542 that is configured to focus and concentrate incoming infrared light onto a motion sensor (e.g., PIR sensors, now shown) located within the tapered lower portion 1514, thereby enhancing the effectiveness and/or sensitivity of the motion sensor. In alternative embodiments, the motion sensor cover 1544 may not include a Fresnel lens.

The motion sensor cover 1544 and the tapered lower portion 1514 couple with a plate to form a battery access door 1540 within the housing 1502 that provides access to removable battery casings configured within housing 1502. This configuration is well suited to a typical use case for the security device 1500, since floodlights are typically located above the head level of a person of average height. A person (or other object) moving at ground level within the monitored area 1501 is thus likely to be well within the field of view of the motion sensor.

The security device 1500 configured with coupling hardware 1530 that may be used to attach the security device 1500 to a supporting structure (not shown). For example, the coupling hardware 1530 may be used to secure the security device 1500 to a wall, a ceiling, a frame, a post, a gate, and so on. In the illustrated embodiment, the coupling hardware 1530 has a first connecting member 1533 secured to the rear wall 1506 of the housing 1502 and a second connecting member 1535 configured for securing to the supporting structure. For example, the second connecting member 1535 may include one or more apertures 1536 that allow the second connecting member 1535 to be screwed or nailed to the supporting structure. The first and second connecting members 1533, 1535 meet at a ball-and-socket joint 1538 that allows the first and second connecting members 1533, 1535 to articulate with respect to one another such that the security device 1500 may be oriented as desired. The ball-and-socket joint 1538 is, however, just one non-limiting example. In alternative embodiments, other types of joints may be provided between the first and second connecting members 1533, 1535, including non-articulating joints. In further alternative embodiments, the coupling hardware 1530 may comprise a single unitary member, rather than the first and second connecting members 1533, 1535.

In certain embodiments, the security device 1500 is configured to control an external illumination source that is capable of being reoriented, the external floodlights may work in conjunction with the integral illumination source (e.g., the visible light emitting elements 1552 and the infrared light emitting elements 1554) to illuminate a broader area around the security device 1500, thereby providing greater security and a larger area for video surveillance and recording. For example, the user may orient the security device 1500 such that the integral illumination source points straight ahead and reorient the external illumination source to point to the sides of the area illuminated by the integral illumination source, thereby illuminating a broader area.

Figure 16:
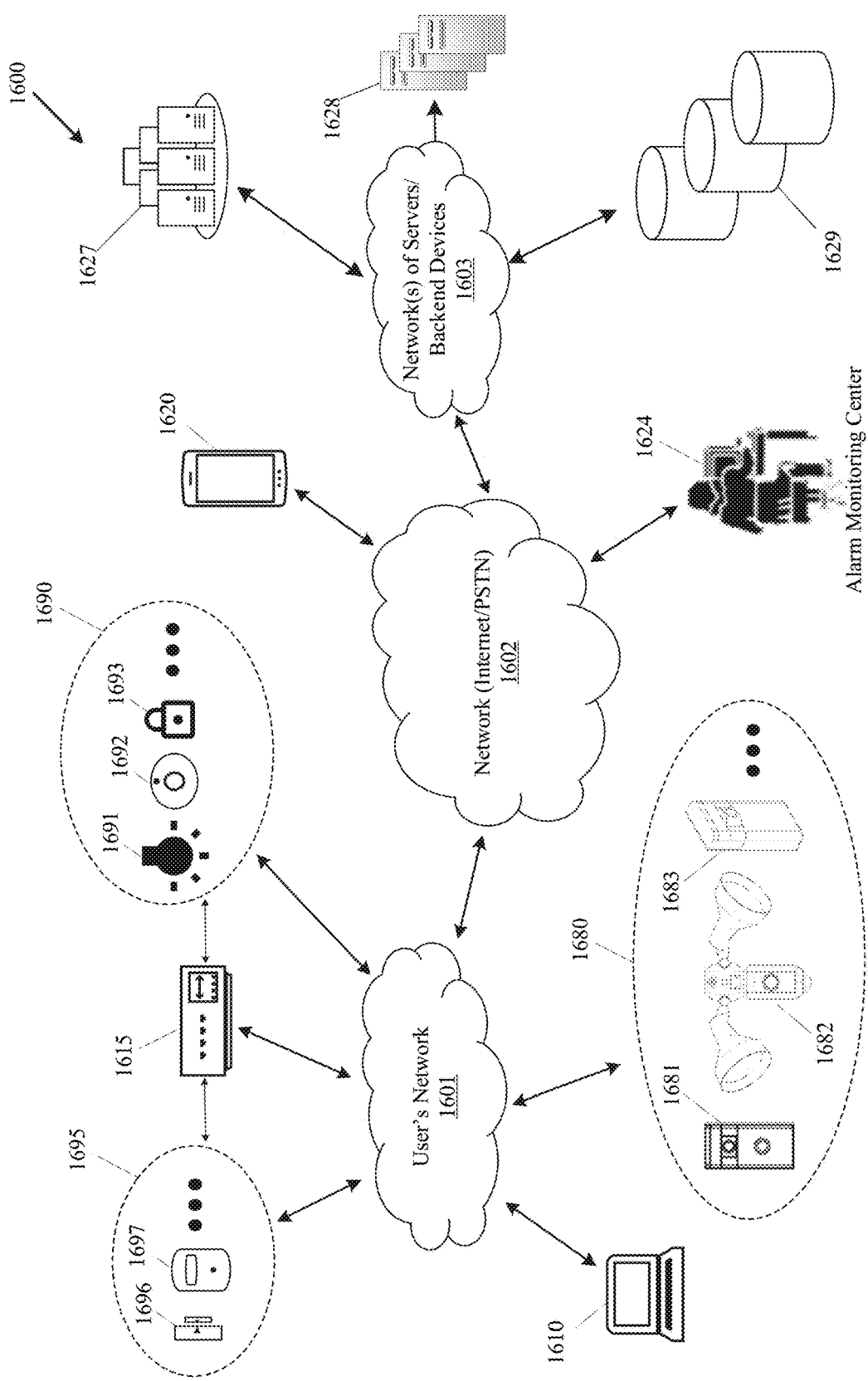
FIG. 16 is a functional block diagram illustrating a system including a hub device with which certain embodiments may be implemented, according to various aspects of present disclosure.

FIG. 16 is a functional block diagram illustrating a system including a hub device with which certain embodiments may be implemented, according to various aspects of present disclosure. A system 1600 for communication between several user devices is connected to a user's network (e.g., a home network) 1601, and remote servers and other remote devices connected to other networks 1602, 1603. Specifically, the user's network 1601, in some of the present embodiments, may include a hub device 1615, security/alarm devices 1695 and smart home devices 1690 associated with the hub device 1615, client device(s) 1610, and audio/video (A/V) recording and communication devices 1680. An alarm monitoring center 1624 and a client device 1620, among other entities and devices, may be connected to the public network 1602. Additionally, the network 1603 may include several backend devices, such as one or more remote storage devices 1629, one or more servers 1628, and one or more application programming interfaces (APIs) 1627. In certain embodiments, the hub device 1615 may represent one or both of the network-connected devices 102 and 702, of FIGS. 1 and 2, respectively, wherein functionality of the hub device 1615 may be included within the network-connected devices 102 and 702. In certain embodiments, the client device 1620 may represent one or both of the client devices 140 and 740 of FIGS. 1 and 7, respectively, wherein functionality of the client device 1620 may be included within the client devices 140 and 740. In certain embodiments, the audio/video (A/V) recording and communication devices 1680 may represent one or both of the security devices 130 and 730 of FIGS. 1 and 7, respectively, wherein functionality of the audio/video (A/V) recording and communication devices 1680 may be include within the security devices 130 and 730.

The user's network 1601 may be, for example, a wired and/or wireless network (e.g., Ethernet network, Wi-Fi network, ZigBee network, Z-Wave network, etc.). Alternatively, or in addition, the user's network 1601 may comprise various networks such as a cellular/mobile network, a local network, a public network, a low-bandwidth network, and/or any other appropriate network. If the user's network 1601 is wireless, or includes a wireless component, the network 1601 may be a Wi-Fi network compatible with the IEEE 802.11 standard and/or other wireless communication standard(s).

As shown in FIG. 16, the user's network 1601 is connected to another network 1602, which may comprise, for example, the Internet and/or a public switched telephone network (PSTN). As described below, the security devices 1695, the smart home devices 1690, and the A/V recording and communication devices 1680 may communicate with the client devices 1610, 1620 via the network 1601 and the network 1602 (Internet/PSTN). In various embodiments, any or all of the hub device 1615, the security devices 1695, the smart home devices 1690, and the A/V recording and communication devices 1680 may communicate with the client devices 1610, 1620 directly (e.g., using one or more wireless technologies and/or protocols, such as Bluetooth, Bluetooth LE, ZigBee, Z-Wave, etc.). The network 1602 may be any wireless network or any wired network, or a combination thereof, configured to operatively couple the above-mentioned modules, devices, and systems as shown in FIG. 16. For example, the network 1602 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection.

With further reference to FIG. 16, the hub device 1615, in some of the present embodiments, may comprise any device that facilitates communication with and control of the alarm devices 1695 and the smart devices 1690. In some aspects of the present embodiments, the hub device 1615 may also facilitate communication with and control of the A/V recording and communication devices 1680. The hub device 1615 may be powered by a connection to an external power (e.g., AC mains). Additionally, the hub device 1615 may include an internal backup battery to which the hub device 1615 switches when the external power is disconnected.

The security devices 1695 and the smart devices 1690, in some of the present embodiments, may communicate with the hub device 1615 directly (e.g., using one or more wireless technologies and/or protocols, such as Bluetooth, Bluetooth LE, ZigBee, Z-Wave, etc.) and/or indirectly (e.g., via the user's network 1601). In some of the present embodiments, the A/V recording and communication devices 1680 may communicate with the hub device 1615 through one or more networks (e.g., the user's network 1601 and the network 1602). Although not shown in FIG. 16, in some embodiments, the hub device 1615 may communicate directly with the A/V recording and communication devices 1680 (e.g., via wired and/or wireless channels). The hub device 1615 may include any or all of the components and/or functionality of the network-connected devices 102 and 702 described in detail above with reference to FIGS. 1 and 7, respectively. The client device 1620 may include any or all of the components and/or functionality of the client devices 140 and 740 described in detail above with reference to FIGS. 1 and 7, respectively. The A/V recording and communication devices 1680 may include any or all of the components and/or functionality of the security devices 130 and 730 described in detail above with reference to FIGS. 1 and 7, respectively. The alarm monitoring center 1624 may include any or all of the components and/or functionality of the agency 180 of FIG. 1 and the law enforcement agency 780 and the screening agency 782 of FIG. 7.

With continued reference to FIG. 16, the alarm devices 1695 may include, but are not limited to, monitoring sensors, such as contact sensors 1696 (e.g., door sensors, window sensors, etc.), motion sensors 1697, noise detectors (not shown), glass-break sensors (not shown), and/or other similar intrusion detection sensors. These sensors (or detectors) may be used for monitoring and/or detecting unauthorized entry into a property. As will be described in more detail below, when any of the sensors 1695 are tripped (or triggered), the sensor may immediately transmit an intrusion event signal to the hub device 1615 via a communication path (e.g., a wireless and/or wired channel).

The smart devices 1690 may include, but are not limited to, indoor/outdoor lighting systems (e.g., smart light emitting diodes (LEDs) 1691), temperature control systems (e.g., thermostats 1692), locking control systems for doors and/or windows (e.g., smart locks 1693), shade/blind control systems (not shown), or any other automation (or smart home) devices that can communicate with, and be controlled by, the hub device 1615.

In some of the present embodiments, the hub device 1615 may be a component of a home automation system installed at a property of a user who is associated with the client devices 1610, 1620. Home automation, or smart home, is building automation for the home. It involves the control and automation of various devices and/or systems, such as lighting, heating (such as smart thermostats), ventilation, air conditioning (HVAC), blinds/shades, and security, as well as home appliances, such as washers/dryers, ovens, or refrigerators/freezers. Wi-Fi is often used for remote monitoring and control. The smart home devices 1690 and the alarm devices 1695, when remotely monitored and controlled via the network (Internet/PSTN) 1602, may be considered to be components of the Internet of Things. The home automation system may use one or more communication technologies and/or protocols, including either or both of wired and wireless protocols, including but not limited to Wi-Fi, X10, Ethernet, RS-485, 6LoWPAN, BTLE, ZigBee, and Z-Wave.

The smart home devices 1690 and the alarm devices 1695 may be controlled via a user interface in some of the present embodiments. The user interface may include any or all of a wall-mounted terminal, software installed on the client devices 1610, 1620 (e.g., a mobile application), a tablet computer or a web interface, and may communicate with Internet cloud services. In addition to communicating with, and/or controlling, the smart home devices 1690 and the alarm devices 1695, in various embodiments, the client devices 1610, 1620 may also be configured to be in network communication with, and/or controlling, the A/V recording and communication devices 1680 (e.g., via the networks 1601 and 1602). The client devices 1610, 1620 may comprise, for example, a mobile phone such as a smartphone, or a computing device such as a tablet computer, a laptop computer, a desktop computer, etc. The client devices 1610, 1620 may include any or all of the components and/or functionality of the client device 1614 described above with reference to FIG. 16 and/or the client device 1800 of FIG. 18.

With further reference to FIG. 16, the system 1600 may also include one or more A/V recording and communication devices 1680 (e.g., installed at the same property where the alarm devices 1695 and smart home devices 1690 are installed). The A/V recording and communication devices 1680 may include, but are not limited to, video doorbells 1681, lighting systems with A/V recording and communication capabilities (e.g., floodlight cameras 1682, spotlight cameras (not shown), etc.), security cameras 1683, or any other similar devices. The structure and functionality of the A/V recording and communication devices 1680 are described above with reference to FIGS. 20 and 21. As described above, in some embodiments, the user may control the A/V recording and communication devices 1680 using either or both of the client devices 1610, 1620. Additionally, in some embodiments, the user may control the A/V recording and communication devices 1680 through the hub device 1615 (e.g., using either or both of the client devices 1610, 1620). In some embodiments, however, the client devices 1610, 1620 may not be associated with an A/V recording and communication device.

As described above, a user may control the smart home devices 1690, the alarm devices 1695, and/or the A/V recording and communication devices 1680, using one or more applications executing on a client device of the user (e.g., the client device 1620). For example, the user may turn on/off the lights 1691, may turn up/down the temperature using the thermostat 1692, may lock/unlock the doors and windows through the locks 1692, etc. The user may also arm/disarm one or more of the security/alarm devices 1695 (and one or more of the A/V recording and communication devices 1680) using the client devices 1610, 1620.

With further reference to FIG. 16, the system 1600 may also include one or more remote storage devices 1629 (may be referred to interchangeably as "cloud storage device(s)"), one or more servers 1628, and one or more application programming interfaces (APIs) 1627 that are connected to network 1603. The network 1603 may be similar in structure and/or function to the above-described user's network 1601. The hub 1615 (and in some embodiments the hub's associated security devices 1695 and smart devices 1690) and/or the A/V recording and communication devices 1680 may communicate with, and be managed by, the remote servers 1628 and APIs 1627 through the networks 1601, 1602, and 1603. Examples of such communications are described below.

While FIG. 16 illustrates the storage devices 1629, the servers 1628, and the APIs 1627 as components of the network 1603 and separate from the network 1602, in some aspects of the present embodiments, one or more of the storage devices 1629, the servers 1628, and the APIs 1627 may be components of the network 1602. Additionally, in some embodiments, the storage devices 1629 may be separate from the servers 1628 or may be an integral component of the servers 1628. Any of the APIs 1627 may comprise, for example, a server (e.g., a real server, or a virtual machine, or a machine running in a cloud infrastructure as a service), or multiple servers networked together, exposing at least one API to client(s) accessing it. These servers may include components such as application servers (e.g., software servers), depending upon what other components are included, such as a caching layer, or database layers, or other components. An API may, for example, comprise many such applications, each of which communicate with one another using their public APIs. In some embodiments, the API may hold the bulk of the user data and offer the user management capabilities, leaving the clients to have very limited state.

Each of the APIs 1627 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API may ease the work of programming graphical user interface (GUI) components. For example, an API may facilitate integration of new features into existing applications (a so-called "plug-in API"). An API may also assist otherwise distinct applications with sharing data, which can help to integrate and enhance the functionalities of the applications.

Each of the APIs 1627 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components may both run on the same machine. Clients and servers may have a user interface, and sometimes other hardware associated with them.

With continued reference to FIG. 16, the system 1600 may also include the security/alarm monitoring center 1624. In some embodiments, each time the hub 1615 receives an intrusion alert signal from one or more of the security/alarm devices 1695 (e.g., when one or more of the sensors 1696 and/or 1697 are triggered), the hub 1615 may send a security breach signal to the security/alarm monitoring center 1624.

In addition to the hub 1615, the A/V recording and communication devices 1680 of some embodiments may also send a security breach signal to the security/alarm monitoring center 1624 when these devices determine that an emergency situation has occurred. For example, when one of the A/V recording and communication devices 1680 (e.g., the floodlight camera 1682) detects a suspicious person and/or activity in an area about the location of the A/V recording and communication device, the device may send a security breach signal to the alarm monitoring center 1624.

The security/alarm monitoring center 1624 (e.g., an operator of the center) may, in turn, dispatch civil authorities to investigate the monitored premises and/or may send other types of notifications, including, but not limited to, text messages, such as SMS (Short Message Service) messages, MMS (Multimedia Messaging Service) messages, email messages, voice messages (either live or recorded), etc. to one or more client devices of a user, such as the client devices 1610, 1620. Typically, when the security/alarm monitoring center 1624 does not receive an acknowledgment from the user, or receive an acknowledgment in which the user informs the center of an emergency situation (e.g., the user is away from home), the monitoring center may contact an emergency call center (not shown in the communication system 1600). The emergency call center may comprise a local 911 call center that serves a region in which the hub 1615 is located. The emergency call center may also be reached by the client devices 1610, 1620, and/or the backend devices 1627, 1628 directly (e.g., using a PSTN) or indirectly (e.g., through the networks 1601, 1602, and 1603).

In some alternative embodiments, the security monitoring center 1624 may not be a separate entity different from the servers 1628 (and/or the APIs 1627). For example, in some of the present embodiments, the servers 1628 may monitor the home security devices 1695 and/or the hub 1615 (and other security systems not shown in the figures) in addition to managing the hub 1615 and/or the A/V recording and communication devices 1680.

In a first aspect, a method submits a video clip captured by a security device as video evidence. During display of the video clip on a client device to an owner of the security device, an instruction is received from the owner to submit the video clip as video evidence to an agency. A timestamp indicative of a recording time of the video clip, a capture location of the video clip, and a unique security device identifier of the security device is determined from metadata of the video clip. A name and address of the owner is determined from a client database. A video summary of video evidence in the video clip is received via the client device interacting with the owner. A digital signature indicative of verification by the owner of veracity of at least one of the video summary and the name of the owner is received from the owner interacting with the client device. The video clip is converted from a first format, used by a database storing the video clip, to a second format, used by the agency. A video evidence file, readable by the agency, is generated to include the converted video clip, the timestamp, the capture location, the unique security device identifier, the video summary, the name, and the digital signature. The video evidence file is securely communicated to the agency.

In certain embodiments of the first aspect, the agency includes one of a law enforcement agency and an insurance agency.

In a second aspect, a method submits video evidence. An electronic request is received from a client device to submit an identified video clip as video evidence to an agency. The video clip and corresponding metadata is retrieved from a database of video clips. Additional information about content of the video clip is received via the client device and a digital signature is received via the client device. A video evidence file is generated to include the content of the video clip, information regarding capture of the video clip based upon the metadata, the additional information, and the digital signature.

In certain embodiments of the second aspect, generating the video evidence file includes converting the content of the video clip from a first format, used by the database, to a second format used by the agency.

In certain embodiments of the second aspect, receiving the additional information about the content of the video clip includes communicating a digital form to the client device and receiving the additional information as a completed digital form from the client device.

In certain embodiments of the second aspect, receiving the additional information about the content of the video clip includes presenting questions and collecting digital answers to the questions from the client device.

Certain embodiments of the second aspect further include transmitting the video evidence file to the agency via a secured connection.

Certain embodiments of the second aspect further include sending the video evidence file to the client device for submission to the agency.

Certain embodiments of the second aspect further include parsing the metadata to determine one or more of a duration of the video clip, a video format for the video clip, a framerate of the video clip, a video resolution of the video clip, an audio format of the video clip, a unique video clip identifier of the video clip, and a filename of the video clip. Generating the video evidence file further includes determining a file size of the video clip based upon the framerate, the video resolution, and the video format, and creating the video evidence file to include: the duration, the video format, the framerate, the video resolution, the file size, the audio format, the unique video clip identifier, and the filename.

Certain embodiments of the second aspect further include receiving, via the client device, an indication of an urgency of a live event captured in the video clip, and including the indication of the urgency within the video evidence file.

In certain embodiments of the second aspect, the urgency is one of emergency and non-emergency.

Certain embodiments of the second aspect further include determining a web address of the agency based upon a user-defined profile and communicating the video evidence file to the agency using the web address.

In a third aspect, an interactive application submits video evidence. The interactive application includes machine-readable instructions stored on computer readable media of a client device, that when executed by a processor of the client device control the processor to: display, in association with a video clip displayed by the client device, a submit evidence button; detect a selection of the submit evidence button; retrieve metadata corresponding to the video clip from a database; collect, via the client device, additional information on content of the video clip; receive, via the client device, verification of the additional information; generate a digital signature; and generate a video evidence file including the content of the video clip, information regarding capture of the video clip based upon the metadata, the additional information, and the digital signature.

Certain embodiments of the third aspect further include machine-readable instructions stored on the computer readable media, that when executed by the processor control the processor to convert the content of the video clip from a first format used by the database to a second format used by the video evidence file.

Certain embodiments of the third aspect further include machine-readable instructions stored on the computer readable media, that when executed by the processor control the processor to transmit the video evidence file to an agency via a secured connection.

In certain embodiments of the third aspect, the video clip displays a live event captured by a security device, and the interactive application further includes machine-readable instructions stored on the computer readable media, that when executed by the processor control the processor to determine a location of the live event based upon a geographic location of the security device; and include the location in the video evidence file.

Certain embodiments of the third aspect further include machine-readable instructions stored on the computer readable media, that when executed by the processor control the processor to determine an urgency of the live event, and include an indication of the urgency within the video evidence file.

In certain embodiments of the third aspect, the urgency is one of emergency and non-emergency.

Certain embodiments of the third aspect further include machine-readable instructions stored on the computer readable media, that when executed by the processor control the processor to display a digital form on the client device and receive the additional information as input to the digital form.

Certain embodiments of the third aspect further include machine-readable instructions stored on the computer readable media, that when executed by the processor control the processor to present questions on the client device and collect digital answers to the questions to collect the additional information.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Changes may be made in the above embodiments without departing from the scope of the present embodiments. The matter contained in the above description and/or shown in the accompanying drawings should be interpreted as illustrative and not in a limiting sense. The following claims are intended to cover all generic and specific features described herein, as well as all statements of the scope of the present embodiments, which, as a matter of language, might be said to fall therebetween.

What is claimed is:

1. A method for submitting a video clip captured by a security device as video evidence, the method comprising:
receiving, during display of the video clip on a client device registered with the security device, an instruction to submit the video clip as video evidence to an agency;
determining, from metadata of the video clip, a timestamp indicative of a recording time of the video clip, and a unique security device identifier of the security device;
determining, from a client database, a name and address of the owner, and a pre-registered location of the security device;
determining, based on the pre-registered location of the security device, contact information for the agency;
interacting, via the client device, with the owner to receive a video summary of video evidence in the video clip;
generating a pre-populated video evidence file including the video clip, the timestamp, the pre-registered location, the unique security device identifier, the video summary, and the name;
converting the video clip from a first format, used by a database storing the video clip, to a second format, used by the agency; and
communicating the video evidence file including the video clip in the second format, securely to the agency using the contact information.

2. The method of claim 1, the agency comprising one of a law enforcement agency or an insurance agency.

3. A method for submitting video evidence, the method comprising:
receiving an electronic request from a client device to submit an identified video clip as video evidence to an agency, the video clip being captured by a security device pre-registered with the client device;
retrieving the video clip and corresponding metadata from a database of video clips;
retrieving, from a client database, a pre-registered location of the security device;
determining, based on the pre-registered location of the security device, contact information for the agency;
receiving, from the client device, additional information about content of the video clip;
generating a video evidence file to include the content of the video clip, information regarding capture of the video clip based upon the metadata, and the additional information; and
communicating the video evidence file to the agency using the contact information.

4. The method of claim 3, wherein the generating of the video evidence file comprises converting the content of the video clip from a first format, used by the database, to a second format used by the agency.

5. The method of claim 3, wherein receiving the additional information about the content of the video clip comprises communicating a digital form to the client device and receiving the additional information as a completed digital form from the client device.

6. The method of claim 3, wherein receiving the additional information about the content of the video clip comprises presenting questions and collecting digital answers to the questions from the client device.

7. The method of claim 3, further comprising transmitting the video evidence file to the agency via a secured connection.

8. The method of claim 3, further comprising sending the video evidence file to the client device for submission to the agency.

9. The method of claim 3, further comprising parsing the metadata to determine one or more of a duration of the video clip, a video format for the video clip, a framerate of the video clip, a video resolution of the video clip, an audio format of the video clip, a unique video clip identifier of the video clip, and a filename of the video clip; and
wherein generating the video evidence file further comprises
determining a file size of the video clip based upon the framerate, the video resolution, and the video format, and
creating the video evidence file to include: the duration, the video format, the framerate, the video resolution, the file size, the audio format, the unique video clip identifier, and the filename.

10. The method of claim 3, further comprising receiving, via the client device, an indication of an urgency of a live event captured in the video clip, and including the indication of the urgency within the video evidence file.

11. The method of claim 10, the urgency being one of emergency or non-emergency.

12. The method of claim 3, further comprising determining a web address of the agency based upon a user-defined profile and communicating the video evidence file to the agency using the web address.

13. The method of claim 1, wherein the determining contact information for the agency comprises:
providing the pre-registered location to a third party; and
receiving, from the third party, the contact information for the agency.

14. The method of claim 1, wherein the contact information comprises information used to contact a part of the agency that is local to a region in which the security device is located.

15. The method of claim 1, further comprising receiving, from the client device, a digital signature, the digital signature being generated in response to user interaction with the client device to verify a pre-populated video evidence file, and indicative of verification by the user of the client device.

* * * * *